United States Patent
Stingu et al.

(10) Patent No.: US 11,509,169 B2
(45) Date of Patent: Nov. 22, 2022

(54) SUB-SURFACE WIRELESS CHARGING

(71) Applicant: Spark Connected LLC, Dallas, TX (US)

(72) Inventors: Petru Emanuel Stingu, Dallas, TX (US); Kenneth Moore, Dallas, TX (US); Yulong Hou, Farmers Branch, TX (US); Ruwanga Dassanayake, Dallas, TX (US)

(73) Assignee: SPARK CONNECTED LLC, Dallas, TX (US)

( * ) Notice: Subject to any disclaimer, the term of this patent is extended or adjusted under 35 U.S.C. 154(b) by 425 days.

(21) Appl. No.: 16/298,769

(22) Filed: Mar. 11, 2019

(65) Prior Publication Data

US 2020/0259369 A1     Aug. 13, 2020

Related U.S. Application Data

(60) Provisional application No. 62/805,209, filed on Feb. 13, 2019.

(51) Int. Cl.
| | | |
|---|---|---|
| *H02J 50/90* | (2016.01) | |
| *H02J 50/12* | (2016.01) | |
| *H02J 50/40* | (2016.01) | |
| *H01F 27/28* | (2006.01) | |
| *H02J 50/50* | (2016.01) | |
| *H02J 7/02* | (2016.01) | |

(52) U.S. Cl.
CPC .......... *H02J 50/12* (2016.02); *H01F 27/2804* (2013.01); *H02J 7/025* (2013.01); *H02J 50/40* (2016.02); *H02J 50/50* (2016.02)

(58) Field of Classification Search
CPC ...................................... H02J 50/12
USPC ........................................................ 320/108
See application file for complete search history.

(56) References Cited

U.S. PATENT DOCUMENTS

| | | |
|---|---|---|
| 3,376,578 A | 4/1968 | Sawyer |
| 3,735,231 A | 5/1973 | Sawyer |
| 4,860,183 A | 8/1989 | Maeda et al. |
| 5,434,504 A | 7/1995 | Hollis et al. |
| 5,498,948 A | 3/1996 | Bruni et al. |
| 6,175,169 B1 | 1/2001 | Hollis, Jr. et al. |
| 6,184,651 B1 | 2/2001 | Fernandez et al. |
| 6,445,093 B1 | 9/2002 | Binnard |
| 6,803,744 B1 | 10/2004 | Sabo |

(Continued)

OTHER PUBLICATIONS

Digi-Key Electronics, "Inductive Versus Resonant Wireless Charging: A Truce May Be a Designer's Best Choice", Contributed By Digi-Key's North American Editors, Aug. 2, 2016, 8 pages.

(Continued)

*Primary Examiner* — Edward Tso
*Assistant Examiner* — Ahmed H Omar
(74) *Attorney, Agent, or Firm* — Slater Matsil, LLP

(57) ABSTRACT

In an embodiment, a sub-surface wireless charger includes a transmitter coil and a controller. The controller is configured to generate a protective pulse having a first energy, determine a characteristic of the transmitter coil based on the generated protective pulse, determine whether it is safe to begin wireless charging based on the determined characteristic, and when the controller determines that it is safe to begin wireless charging, generate an operating pulse having a second energy, where the second energy is higher than the first energy.

15 Claims, 18 Drawing Sheets

(56) References Cited

U.S. PATENT DOCUMENTS

| | | | |
|---|---|---|---|
| 6,949,845 | B2 | 9/2005 | Oisugi et al. |
| 8,049,370 | B2 | 11/2011 | Azancot et al. |
| 8,193,769 | B2 | 6/2012 | Azancot et al. |
| 8,957,549 | B2 | 2/2015 | Kesler et al. |
| 9,590,444 | B2 | 3/2017 | Walley et al. |
| 9,800,191 | B2 | 10/2017 | Barsilai et al. |
| 9,853,441 | B2 | 12/2017 | Teggatz et al. |
| 10,054,622 | B2 | 8/2018 | Hernandez et al. |
| 10,079,090 | B2 | 9/2018 | Teggatz et al. |
| 10,164,600 | B2 * | 12/2018 | Kormann ................. H03H 7/38 |
| 10,168,443 | B2 | 1/2019 | Mangano et al. |
| 2006/0061323 | A1 | 3/2006 | Cheng et al. |
| 2010/0181841 | A1 | 7/2010 | Azancot et al. |
| 2010/0219183 | A1 | 9/2010 | Azancot et al. |
| 2010/0244579 | A1 | 9/2010 | Sogabe et al. |
| 2011/0050164 | A1 | 3/2011 | Partovi et al. |
| 2011/0062793 | A1 | 3/2011 | Azancot et al. |
| 2011/0074344 | A1 | 3/2011 | Park et al. |
| 2011/0121660 | A1 | 5/2011 | Azancot et al. |
| 2011/0227527 | A1 | 9/2011 | Zhu et al. |
| 2012/0032632 | A1 | 2/2012 | Soar |
| 2013/0049484 | A1 | 2/2013 | Weissentern et al. |
| 2013/0082651 | A1 | 4/2013 | Park et al. |
| 2013/0257172 | A1 | 10/2013 | Teggatz et al. |
| 2013/0264973 | A1 | 10/2013 | Garg et al. |
| 2013/0285601 | A1 | 10/2013 | Sookprasong et al. |
| 2013/0300204 | A1 | 11/2013 | Partovi |
| 2014/0080409 | A1 | 3/2014 | Frankland et al. |
| 2014/0119082 | A1 * | 5/2014 | Mueck ................... H02J 5/005 363/106 |
| 2014/0184150 | A1 | 7/2014 | Walley |
| 2015/0115877 | A1 | 4/2015 | Arai et al. |
| 2015/0142348 | A1 | 5/2015 | Huang et al. |
| 2015/0249484 | A1 | 9/2015 | Mach et al. |
| 2015/0341087 | A1 | 11/2015 | Moore et al. |
| 2016/0149440 | A1 | 5/2016 | Staring et al. |
| 2016/0226296 | A1 * | 8/2016 | Bae ............................ H02J 5/00 |
| 2017/0163100 | A1 | 6/2017 | Vocke et al. |
| 2017/0279306 | A1 * | 9/2017 | Elad ........................ H02J 50/80 |
| 2017/0346348 | A1 * | 11/2017 | Lethellier ............... H02J 50/80 |
| 2018/0014709 | A1 * | 1/2018 | O'Brien ................. A47L 9/2884 |
| 2018/0131218 | A1 * | 5/2018 | Shellhammer .......... H02J 7/025 |
| 2018/0272130 | A1 * | 9/2018 | Meskens ............ A61N 1/36036 |
| 2019/0109498 | A1 | 4/2019 | Stingu et al. |
| 2019/0190320 | A1 | 6/2019 | Park |
| 2019/0319494 | A1 * | 10/2019 | Park ........................ H02J 50/60 |
| 2019/0334388 | A1 | 10/2019 | Van Wageningen et al. |

OTHER PUBLICATIONS

Zens, "Zens First Worldwide to Introduce Built-in Wireless (Sub-)Surface Charger with Apple and Samsung Fast Charge", Mar. 23, 2018, 5 pages.

Consumer Reports, "Wireless charging pad review We tested four popular pads to see whether they really make your life easier", Wireless Charging Pad Reviews, Dec. 11, 2013, 5 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of analytical models for the design of linear and planar motors", TU/e Eindhoven University of Technology, DOI: 10.1109/TMAG/2014.2328556, Jan. 1, 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430 Extended Scan Interface (ESI)", Texas Instruments, Application Report, SLAA639, Jul. 2014, 33 pages.

Lynch, Brian T., "Under the Hood of a DC/DC Boost Converter", Texas Instruments, Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Texas Instruments "Industry-Leading Wireless Power Solutions—The Most Widely Adopted in the Market", ti.com/wirelesspower, SLYT485C, 3 pages.

Texas Instruments, "Introduction to Wireless Power", QI WPC 1.1 compliant, www.ti.com/wirelesspower, 49 pages.

Waters, Benjamin et al., "Optimal Coil Size Ratios for Wireless Power Transfer Applications", IEEE International Symposium on Circuits and Systems (ISCAS), Jun. 1-5, 2014, 4 pages.

Wikipedia, "Electromagnetic coil", https://en.wikipedia.org/w/index.php?title=Electromagnetic_coil&oldid=776415501, Apr. 2017, 6 pages.

Wikipedia, "Inductive charging", https://en.wikipedia.org/w/index.php?title=Inductive_charging&oldid=802615270, Sep. 2017, 7 pages.

Wikipedia, "Qi (standard)", https://en.wikipedia.org/w/index.php?title=Qi_(standard)&oldid=803427516, Oct. 2017, 5 pages.

Wireless Power Consortium, "The Qi Power Transfer System Power Class 0 Specification—Parts 1 and 2: Interface Definitions", Version 1.2.3, Feb. 2017, 165 pages.

* cited by examiner

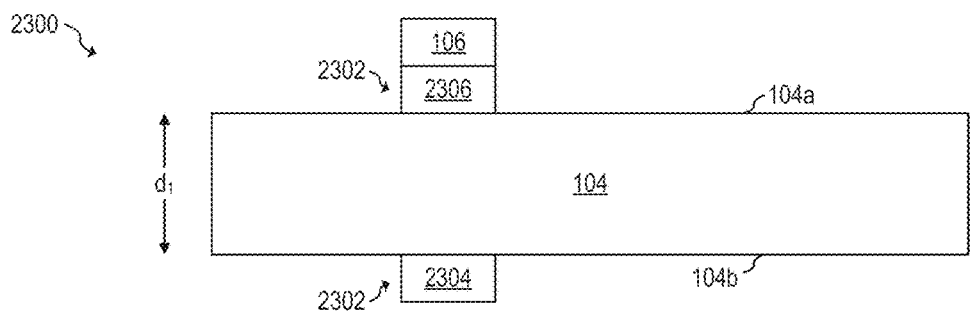
FIG. 23
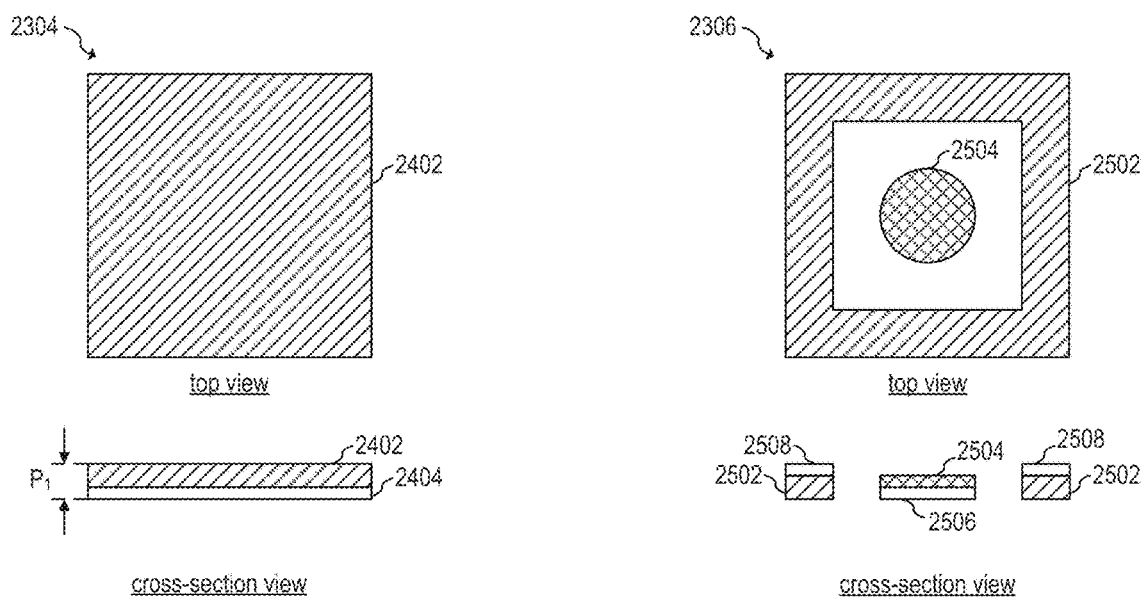
FIG. 24
FIG. 25
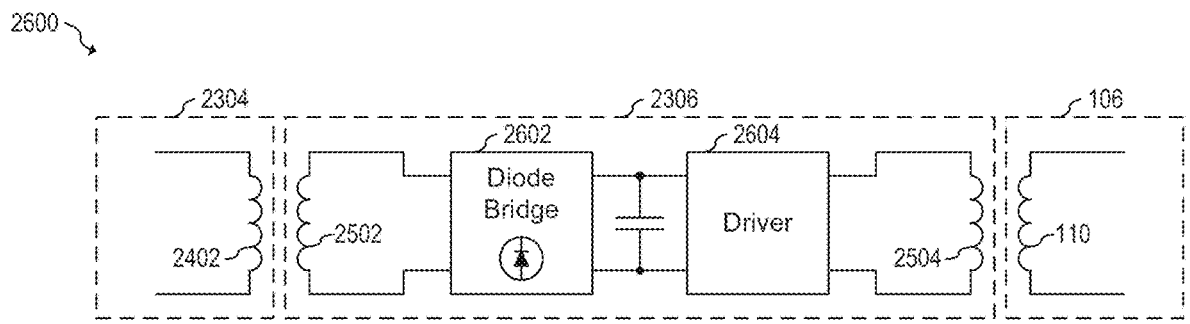
FIG. 26 cross-section view cross-section view perspective view bottom view perspective view

SUB-SURFACE WIRELESS CHARGING

CROSS-REFERENCE TO RELATED APPLICATIONS

This application claims the benefit of U.S. Provisional Application No. 62/805,209, filed on Feb. 13, 2019, which application is hereby incorporated herein by reference.

TECHNICAL FIELD

The present invention relates generally to an electronic system and method, and, in particular embodiments, to sub-surface wireless charging.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, are becoming widely adopted.

Wireless charging standards, such as the Qi standard, provide specifications that cover various aspects of the wireless charging process, including the frequency used to transmit wireless power from a wireless charger to a receiver, and communication protocols that allow a receiver to communicate with a wireless charger. The standards also provide specifications directed to safety of the wireless charger and the receiver.

SUMMARY

In accordance with an embodiment, a sub-surface wireless charger includes a transmitter coil and a controller. The controller is configured to generate a protective pulse having a first energy, determine a characteristic of the transmitter coil based on the generated protective pulse, determine whether it is safe to begin wireless charging based on the determined characteristic, and when the controller determines that it is safe to begin wireless charging, generate an operating pulse having a second energy, where the second energy is higher than the first energy.

In accordance with an embodiment, a sub-surface wireless charger includes a transmitter coil and a controller. The controller is configured to generate a first pulse having a first energy, receive a first response from a receiver via the transmitter coil during the first pulse, generate a second pulse having a second energy, the second energy being higher than the first energy, and prevent the sub-surface wireless charger from beginning wireless charging the receiver if a second response is not received from the receiver via the transmitter coil during the second pulse.

In accordance with an embodiment, a sub-surface wireless charger includes a transmitter coil and a controller. The controller is configured to generate a first pulse having a first energy, receive a first response from a receiver via the transmitter coil during the first pulse, cause the transmitter coil to be energized after the first pulse, while the transmitter coil is energized, determine whether the receiver is performing detuning, and stop energizing the transmitter coil or reduce an energy level flowing through the transmitter coil when the controller determines that the receiver is performing detuning.

In accordance with an embodiment, a wireless charger includes a sub-surface wireless charger having a first transmitter coil, and a repeater charger having a receiver coil and a second transmitter coil. The sub-surface wireless charger is configured to generate wireless power using the first transmitter coil at a first frequency. The repeater charger is configured to receive wireless power from the sub-surface wireless charger using the receiver coil, power a first circuit using the received wireless power, and generate wireless power using the second transmitter coil at a second frequency that is different from the first frequency.

In accordance with an embodiment, a device includes a plurality of sensing coils configured to receive wireless power from a sub-surface wireless charger; a measuring circuit coupled to the plurality of sensing coils and configured to sense a voltage across each of the plurality of sensing coils; a visual indicator; and a controller coupled to the measuring circuit. The controller is configured to determine a direction of a location of maximum coupling coefficient between the sub-surface wireless charger and the device based on an output of the measuring circuit, and indicate the direction of the location of maximum coupling coefficient via the visual indicator.

In accordance with an embodiment, a sub-surface wireless charger includes a non-volatile memory, a transmitter coil, and a controller. The controller is configured to, before calibration, transmit a first pulse having a first energy via the transmitter coil during a ping process, during calibration, transmit the first pulse having the first energy via the transmitter coil, receive a calibration code via the transmitter coil, store data corresponding to a second energy in the non-volatile memory based on the received calibration code, where the second energy is higher than the first energy, and after calibration, transmit a second pulse having the second energy via the transmitter coil, during the ping process.

In accordance with an embodiment, a wireless charger includes a sub-surface wireless charger including a transmitter coil and a first controller, and a foreign object detector. The foreign object detector includes a sensing coil, a second controller and a communication interface coupled to the sensing coil. The second controller is configured to determine a first average power at a location of the sensing coil based on a voltage across the sensing coil, and transmit data based on the first average power via the sensing coil using the communication interface. The first controller is configured to receive data from the transmitter coil, determine the first average power based on the received data, determine a second average power received by a receiver, and determine whether a foreign metallic object is present in a charging space of the sub-surface wireless charger by comparing the first average power with the second average power.

In accordance with an embodiment, a wireless charger includes a sub-surface wireless charger, and a ferrite sticker having a hollow shape and disposed in a charging space of the sub-surface wireless charger. The ferrite sticker is configured to be disposed between the sub-surface wireless charger and a receiver.

In accordance with an embodiment, a wireless charger includes a transmitter coil; and a metallic heatsink having a first surface attached to the transmitter coil. The transmitter coil is configured to produce a magnetic field when the transmitter coil is energized. The metallic heatsink has a second surface that has a shape that tracks magnetic lines of the magnetic field.

BRIEF DESCRIPTION OF THE DRAWINGS

For a more complete understanding of the present invention, and the advantages thereof, reference is now made to the following descriptions taken in conjunction with the accompanying drawings, in which:

FIG. 23 shows a schematic diagram of a sub-surface wireless charging system that includes a two-part wireless charger, according to an embodiment of the present invention;

FIGS. 24 and 25 show a transmitter coil and repeater coils, respectively, of the two-part wireless charger of FIG. 23, according to an embodiment of the present invention;

FIG. 26 shows a schematic diagram of a sub-surface wireless charging system, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
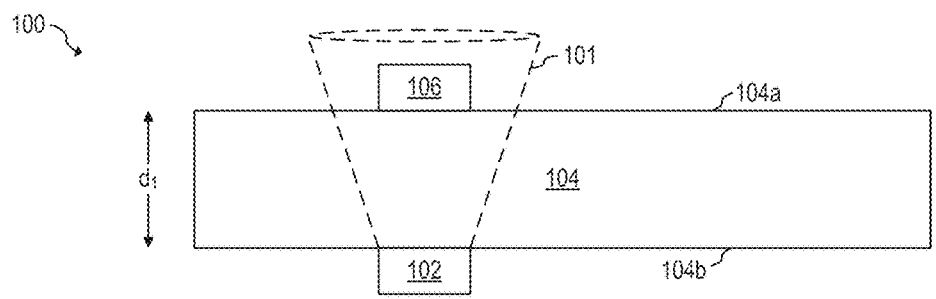
FIG. 1 shows a schematic diagram of a sub-surface wireless charging system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention are described in a specific context, sub-surface wireless charging systems and methods. Embodiments of the present invention may be used in other systems, such as other wireless charging systems, for example.

It is understood that the term wireless charging is not limited to the charging of a battery, but includes wireless power transmission generally, unless stated otherwise.

In an embodiment of the present invention, an active alignment device is used for finding a location of maximum coupling coefficient between a sub-surface wireless charger and a receiver. The active alignment device uses a plurality of sensing coils to determine the direction of the location of maximum coupling coefficient and uses an indicator, such as a visual indicator, to indicate the direction of the location of maximum coupling coefficient. In some embodiments, the active alignment device is powered by the sub-surface wireless charger.

In an embodiment of the present invention, a testing device that includes a receiver coil is used to test whether a sub-surface wireless charger is capable of delivering a particular amount of wireless power once the sub-surface wireless charger is installed in a surface. The testing device includes a variable load that can be adjusted to mimic a particular power consumption, such as 10 W, for example. The testing device then measures the actual amount of wireless power received by the receiver coil, e.g., based on the voltage across the receiver coil and the current flowing through the receiver coil to determine whether the particular amount of wireless power was delivered. In some embodiments the testing device is implemented together with an active alignment device inside the same device.

In an embodiment of the present invention, a programmable sub-surface wireless charger is configured to generate an initial ping having an initial default ping power that is low enough to be safe, even in situations where a receiver and the sub-surface wireless charger are very close to each other (e.g., at 5 mm or less). A testing device equipped with a high inductance receiver coil receives the initial ping and transmits to the sub-surface wireless charger a programming command to reprogram the default ping power based on the voltage measured across the receiver coil of the testing device during a calibration procedure. The sub-surface wireless charger receives the reprogrammed command and changes the default ping power from the initial default ping power to an operating default ping power, where the operating default ping power is configured to generate a voltage across a receiver coil of a receiver within safe operating limits (e.g., between 3 V and 9 V). The new default setting is written in, e.g., non-volatile memory of the sub-surface wireless charger. In some embodiments, the sub-surface wireless charger is configured to not begin wirelessly charging until the testing device successfully reprograms the sub-surface wireless charger during the calibration procedure.

In an embodiment of the present invention, a protection circuit of a sub-surface wireless charger determines whether a receiver is unsafely close to the sub-surface wireless charger based on one or more changes in the characteristics of the transmitting coil of the sub-surface wireless charger. If it is determined that the receiver is unsafely close to the sub-surface wireless charger, the sub-surface wireless charger does not proceed with the ping process and subsequent wireless charging. The sub-surface wireless charger measures or determines the one or more characteristics of the transmitting coil by generating a protection pulse with low enough energy to be safe at very close distances, such as when the sub-surface wireless charger and the receiver are in contact with each other, and by measuring or detecting one or more properties of the oscillations that result from the protection pulse.

In some embodiments, the sub-surface wireless charger measures or determines the resonance frequency, the change in resonance frequency with respect to a predetermine resonance frequency value, the inductance of the transmitter coil, the change in inductance of the transmitter coil with respect to a predetermined inductance value, the damping factor, the change in damping factor with respect to a predetermined damping factor value, the quality factor, and/or the change in quality factor with respect to a predetermined quality factor value.

In an embodiment of the present invention, a multi-ping method is used to determine whether a receiver is too close to a sub-surface wireless charger. A first ping with a first energy is generated. A second ping with a second energy is generated after the first ping, where the second energy is higher than the first energy. If the sub-surface wireless charger receives data from the receiver during the first ping but not during the second ping, it is determined that the receiver is too close to the sub-surface wireless charger.

In some embodiments, a sub-surface wireless charger determines that a receiver is too close by detecting the detuning by the receiver. The sub-surface wireless charger determines whether the receiver is performing detuning by monitoring a voltage across a transmitter coil of the sub-surface wireless charger and determining whether a signal with a frequency lower than a first frequency (e.g., 1 kHz) has a first energy higher than an energy threshold.

In an embodiment of the present invention, a two-part wireless charger includes a sub-surface wireless charger disposed at a first surface of a surface, and a repeater charger disposed at a second surface of a surface. The sub-surface wireless charger transfers wireless power to the repeater charger and through the surface using resonance charging (e.g., at a frequency of 6.78 MHz). The repeater charger receives power from the sub-surface wireless charger and transmits wireless power to a receiver using inductive wireless charging (e.g., at a frequency between 80 kHz and 300 kHz). By using a repeater charger, the two-part wireless charger is advantageously capable to provide wireless power to a receiver when the surface is relatively thick (e.g., thicker than 20 mm, such as 25 mm, 30 mm, or thicker).

In some embodiments, the repeater charger that includes a controller that is used to demodulate data from a receiver and to control the power that is wirelessly transmitted to the receiver.

In some embodiments, the controller of the repeater charger performs foreign object detect (FOD) by determining the average power transmitted by a transmitter coil of the repeater charger and comparing the average power transmitted by a transmitter coil of the repeater charger with the average power received at a receiver coil of the receiver.

In some embodiments, the controller of the repeater charger transmits data to the sub-surface wireless charger (e.g., using load modulation) to cause the sub-surface wireless charger to adjust the level of wireless power transmitted to the repeater charger.

In some embodiments, a controller of the sub-surface wireless charger performs foreign object detect (FOD) by determining the average power transmitted by a transmitter coil of the repeater charger and comparing the average power transmitted by a transmitter coil of the repeater charger with the average power received at a receiver coil of the receiver. In some embodiments, the controller of the sub-surface wireless charger determines the average power transmitter by the transmitter coil of the repeater charger and the average power received by the receiver coil of the receiver based on data received from the transmitter coil of the sub-surface wireless charger.

In some embodiments, a repeater charger does not include a micro-controller. In such embodiments, the repeater charger causes any load modulation present in the transmitter coil of the repeater charger to propagate through the receiver coil of the repeater charger and to the transmitter coil of the sub-surface wireless charger. A controller of the sub-surface wireless charger is configured to demodulate data received from the transmitter coil of the sub-surface wireless charger and adjust the power delivered via the transmitter coil of the sub-surface wireless charger based on the received data. In some embodiments, the repeater charger includes an oscillator, where a driver of the repeater charger is configured to drive the transmitter coil of the repeater charger based on an output of the oscillator.

In some embodiments, a sub-surface wireless charger that is implemented as an inductive charger performs FOD detection by using an FOD unit that is disposed between a receiver and the sub-surface wireless charger. The FOD unit comprises a sensing coil, a controller and a communication interface coupled to the sensing coil. The controller of the FOD unit determines a first average power at a location of the sensing coil of the FOD unit based on a voltage across the sensing coil of the FOD unit and transmits the data indicative of the first average power to the sub-surface wireless charger via the sensing coil using load modulation. A controller of the sub-surface wireless charger receives data associated with the first average power from the transmitter coil of the sub-surface wireless charger. The controller of the sub-surface wireless charger also receives data associated with a second average power received by a receiver via the transmitter coil of the sub-surface wireless charger. The controller of the sub-surface wireless charger then determines whether a metallic foreign object is present in the charging space of the sub-surface wireless charger based on comparing the first average power with the second average power.

In some embodiment, the FOD unit communicates with the sub-surface wireless charger by performing load modulation during an FOD data transmission time, where the FOD data transmission time is in between data transmission portions sent by the receiver to the sub-surface wireless charger. In some embodiments, the FOD unit determines whether the receiver is transmitting data by determining whether the voltage across the sensing coil includes a signal with a frequency between, e.g., 1 kHz and 2 kHz, that has an energy higher than a threshold.

In an embodiment of the present invention, a wireless charger includes a sub-surface wireless charger disposed below a surface and a top-side ferrite sticker disposed above the surface between a receiver and a top surface of the surface. In some embodiments, the ferrite sticker advantageously increases the coupling coefficient between sub-surface wireless charger and the receiver. In some embodiments, the top-side ferrite sticker includes a mark indicative of a location of maximum coupling coefficient between the sub-surface wireless charger and the receiver.

In an embodiment of the present invention, a sub-surface wireless charger includes a heatsink that has an outer surface that tracks the magnetic lines of the magnetic field generated by the transmitter coil of the sub-surface wireless charger. In some embodiments, such outer surface has a toroidal shape.

FIG. 1 shows a schematic diagram of sub-surface wireless charging system 100, according to an embodiment of the present invention. Sub-surface wireless charging system 100 includes sub-surface wireless charger 102, surface 104, and receiver 106. Surface 104 includes top surface 104a, and bottom surface 104b. Sub-surface wireless charger 102 is attached to bottom surface 104b (e.g., glued). Receiver 106 is disposed over top surface 104a, e.g., when receiver 106 is to receive wireless power from sub-surface wireless charger 102.

During normal operation, sub-surface wireless charger 102 receives power, e.g., from mains, and wirelessly transmits power through surface 104 using, e.g., a coil into charging space 101. Receiver 106 wirelessly receives power from sub-surface wireless charger 102 and uses such received power to, e.g., operate receiver 106, charge a battery (not shown) coupled to receiver 106, and/or retransmit power (e.g., wirelessly), e.g., to another device (not shown).

The intensity of the power received by receiver 106 from sub-surface wireless charger 102 depends, in part, on the distance between receiver 106 and sub-surface wireless charger 102. For example, generally, the closer receiver 106 is to sub-surface wireless charger 102, the higher the intensity of wireless power received by receiver 106 from sub-surface wireless charger 102.

Surface 104 may be, for example, a table, a wall, or another surface. Although surface 104 is illustrated as a planar horizontal surface, it is understood that surface 104 may be a vertical surface, such as a wall, or an inclined surface. In some embodiments, surface 104 may not be planar.

Surface 104 may be made of wood, ceramic, plastic, and/or other non-conductive materials, for example. Surface 104 may have a thickness $d_1$ of, e.g., 20 mm. In some embodiments, thickness $d_1$ may be thicker than 20 mm, such as 25 mm, 30 mm, or thicker. In other embodiments, thickness $d_1$ may be thinner than 20 mm, such as 18 mm, 15 mm, 10 mm or thinner.

Receiver 106 may be, for example, a smartphone, a tablet, a laptop, a wearable, a power tool, or another battery operated portable device. Other devices are also possible. For example, in some embodiments, receiver 106 may not include a battery. In some embodiments, receiver 106 may be configured to operate only when wirelessly receiving power. In some embodiments, receiver 106 may not be a portable device. For example, receiver 106 may be attached to top surface 104a. For example, receiver 106 may be a thermostat to control a heating, ventilation, and air conditioning (HVAC) of a house, and surface 104 is a vertical wall, where sub-surface wireless charger 102 is attached to the inside surface of the wall and the thermostat is attached to the outside surface of the wall.

Sub-surface wireless charger 102 may be capable of transferring 10 W of wireless power to receiver 106. In some embodiments, sub-surface wireless charger 102 may be capable of transferring more than 10 W of wireless power to receiver 106, such as 15W, 20 W, or more. In other embodiments, the maximum power that sub-surface wireless charger 102 is capable of transferring to receiver 106 may be lower than 10 W, such as 5 W or less.

Figure 2:
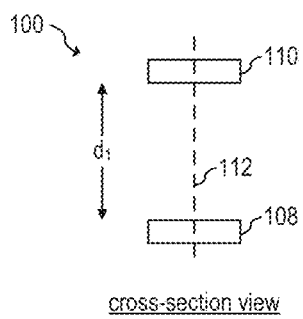
FIG. 2 shows a transmitter coil and a receiver coil of the sub-surface wireless charging system of FIG. 1 having their respective coil centers aligned with a centerline, according to an embodiment of the present invention.

In sub-surface wireless charging systems, such as sub-surface wireless charging system 100, the coupling coefficient between the transmitter coil of the sub-surface wireless charger and the receiver coil of the receiver is generally low. For example, FIG. 2 shows transmitter coil 108 of sub-surface wireless charger 102 and receiver coil 110 of receiver 106 having their respective coil centers aligned with centerline 112, according to an embodiment of the present invention.

Transmitter coil 108 may be implemented, for example, using Litz wire. Other implementations are also possible.

Receiver coil 106 may be implemented, for example, using traces in a printed circuit board (PCB). Other implementations, such as using stamped metal, or Litz wires may also be used.

The coupling coefficient between transmitter coil 108 and receiver coil 110 when the centers of transmitter coil 108 and receiver coil 110 are aligned with centerline 112 and when thickness $d_1$ is 20 mm maybe, e.g., about 0.1. In some embodiments, centerline 112 is orthogonal to the winding loops of transmitter coil 112.

The coupling coefficient is typically maximized when transmitter coil 108 and receiver coil 110 are aligned with centerline 112. Less than perfect alignment (e.g., when the coil centers of transmitter coil 108 and receiver coil 110 are misaligned) causes the coupling coefficient to be lower, thereby reducing the efficiency of the wireless power transfer as well as the maximum amount of power that can be transferred by sub-surface wireless charger 102 into receiver 106.

In some embodiments, sub-surface wireless charger 102 does not move with respect to surface 104 during normal operation. For example, in some embodiments, sub-surface wireless charger 102 is firmly attached (e.g., using glue) to bottom surface 104b of surface 104.

In some embodiments, surface 104 is transparent or semitransparent. In such embodiments, a user of receiver 106 (e.g., a human) may be able to find centerline 112 by looking through surface 104 and may be able to place receiver 106 such that the coil centers of transmitter coil 108 and receiver coil 110 are aligned. In other embodiments, surface 104 is not transparent. In such embodiments, a user of receiver 106 may rely on a marking (e.g., a label) in top surface 104a to align receiver coil 110 with transmitter coil 108. The user may use such marking as a reference for placing receiver 106 on top of surface 104a to maximize the coupling coefficient between transmitter coil 108 and receiver coil 110.

In an embodiment of the present invention, an active alignment device is used for finding a location of maximum coupling coefficient between a sub-surface wireless charger and a receiver. The active alignment device uses a plurality of sensing coils to determine the direction of the location of maximum coupling coefficient and uses an indicator, such as a visual indicator, to indicate the direction of the location of maximum coupling coefficient. In some embodiments, the active alignment device is powered by the sub-surface wireless charger.

Figure 3:
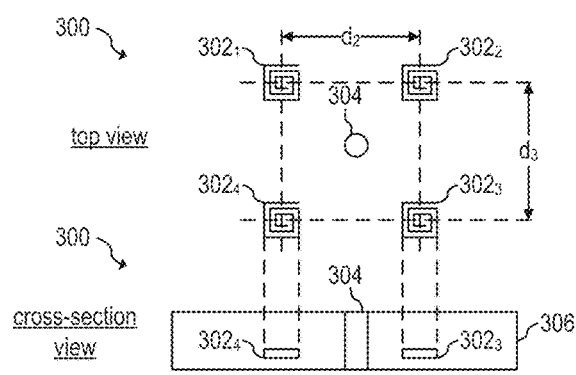
FIG. 3 shows a schematic diagram of an active alignment device, according to an embodiment of the present invention.

FIG. 3 shows a schematic diagram of active alignment device 300, according to an embodiment of the present invention. The top portion of FIG. 3 shows a top view of a layout of active alignment device 300. The bottom portion of FIG. 3 shows a cross-section view of active alignment device 300.

Active alignment device 300 includes sensing coils $302_1$, $302_2$, $302_3$, and $302_4$, mark 304, and enclosure 306. In some embodiments, active alignment device 300 may include more than 4 sensing coils, such as 5, 10, 50, 64, or more. In some embodiments, active alignment device 300 may include less than four sensing coils, such as three, for example.

During normal operation, active alignment device 300 is disposed over top surface 104a of surface 104. As a user, such as a human, moves active alignment device 300 along top surface 104a, each of the sensing coils 302 develops a voltage across the respective sensing coils 302 based on the intensity of the magnetic field received from sub-surface wireless charger 102.

As active alignment device 300 moves closer to centerline 112, voltages develop across sensing coils 302. Sensing coils 302 that are closer than centerline 112 have larger voltages across them than sensing coils 302 that are farther from centerline 112. Active alignment device 300 determines the direction of the location of centerline 112 with respect to mark 304 based on the differences between voltages across sensing coils 302. When centerline 112 crosses mark 304, active alignment device 300 is aligned with centerline 112.

In some embodiments, mark 304 is symmetrically disposed with respect to the plurality of sensing coils 302. For example, in some embodiments, the centers of each sensing coils 302 are symmetrically disposed with respect to mark 304. For example, in some embodiments, distance $d_2$ and distance $d_3$ between centers of sensing coils are equal.

By symmetrically disposing mark 304 with respect to the plurality of sensing coils 302, the location of mark 304 corresponds to a maximum coupling coefficient when each voltage across each sensing coil 302 is equal.

In other embodiments, mark 304 is not symmetrically disposed. In such embodiments, the none-symmetries are compensated, e.g., by mathematical computations such that the location of mark 304 corresponds to a maximum coupling coefficient when each of the compensated voltages across each sensing coil 302 is equal.

In some embodiments, the location in top surface 104a that corresponds to a maximum coupling coefficient may not corresponds to centerline 112 (e.g., due to other materials being present or other particular geometries that may modify the shape of the magnetic field). In such embodiments, active alignment device 300 is advantageously capable of finding the location of maximum coupling coefficient, which may not correspond to centerline 112. Using active alignment device 300, thus, may advantageously maximize coupling coefficient between transmitter coil 108 and receiver coil 110 even in cases where surface 104 is transparent or semi-transparent.

Figure 4:
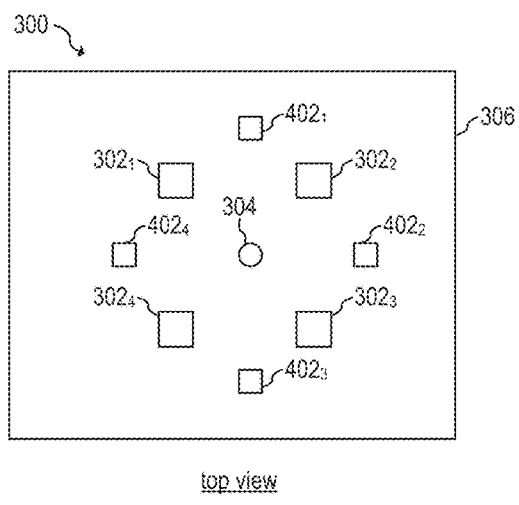
FIG. 4 shows a top view of the active alignment device of FIG. 3 showing an enclosure, according to an embodiment of the present invention.

FIG. 4 shows a top view of active alignment device 300 showing enclosure 306, according to an embodiment of the present invention. As shown in FIGS. 3 and 4, mark 304 is indicated by a hole in enclosure 306. Having a hole in enclosure 306 to indicate mark 304 advantageously allows a user to use a marking device, such as a pencil or pen, to mark top surface 104a when active alignment device 300 identifies that the location of maximum coupling coefficient is at mark 304.

In some embodiments, mark 304 may be indicated in other ways. For example, in some embodiments, a stamp mechanism at a bottom of active alignment device 300 may be disposed at the location of mark 304. In such embodiments, when active alignment device 300 determines that the location of maximum coupling coefficient corresponds to mark 304, the stamp mechanism is activated to mark top surface 104a. In such embodiments, a hole in enclosure 306 to indicate mark 304 may be avoided. Other implementations are also possible.

As shown in FIG. 4, active alignment device 300 also includes light emitting diodes (LEDs) $402_1$, $402_2$, $402_3$, and $402_4$. LEDs 402 may be turned on and off to indicate the direction of the location of maximum coupling. For example, in some embodiments, if the voltage across sensing coils $302_1$ and $302_4$ is equal to voltage $V_1$ (e.g., 3 V), and the voltage across sensing coils $302_2$ and $302_3$ is equal to voltage $V_2$ lower than voltage $V_1$ (e.g., voltage $V_2$ equal to 2 V), LED $402_4$ turns on to indicate that the location of maximum coupling coefficient is to the left active alignment device 300. When the voltages across all of sensing coils $302_1$, $302_2$, $302_3$, and $302_4$ are the same, all LEDs $402_1$, $402_2$, $402_3$, and $402_4$ turn on to indicate that the location of maximum coupling coefficient has been found, (e.g., which corresponds to mark 304). It is understood that LEDs 402 may be turned on or off in different ways to indicate the direction of the location of maximum coupling coefficient.

In some embodiments, the number of LEDs 402 may be higher than 4, such as 5, 8, 10, 30, 50, 64, or more, or lower than 4, such as 3. In some embodiments, the number of LEDs 402 may be equal to the number of sensing coils 302. In some embodiments, a display may be used instead of or in addition to LEDs 402 to indicate the direction of the location of maximum coupling coefficient. Other implementations are also possible. For example, in some embodiments, a speaker may be used, instead of, or in addition to visual indicators, to indicate the direction of the location of maximum coupling coefficient.

Figure 5:
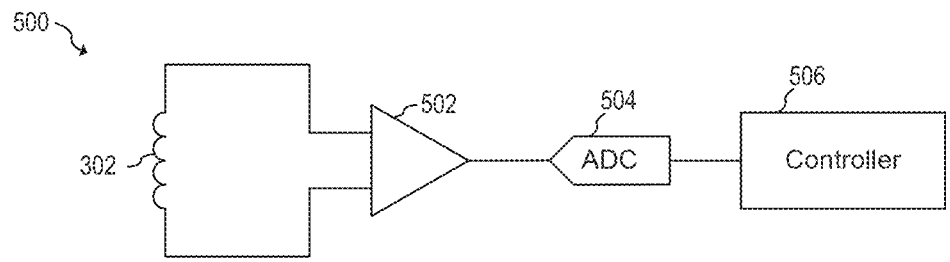
FIG. 5 shows a schematic diagram of a sensing circuit for operating the sensing coils of FIG. 3, according to an embodiment of the present invention.

FIG. 5 shows a schematic diagram of sensing circuit 500 for operating sensing coils 302, according to an embodiment of the present invention. Sensing circuit 500 includes differential amplifier 502, analog-to-digital converter (ADC) 504, and controller 506.

During normal operation, a voltage is generated across terminals of coil 306 based on the strength of the magnetic field flowing through the core area of sensing coil 302. Such voltage is amplified by amplifier 502 and then converted into digital data by ADC 504. Controller 506 receives the digital data from ADC 504 and controls, e.g., LEDs 402 based on the received digital data.

Figure 6:
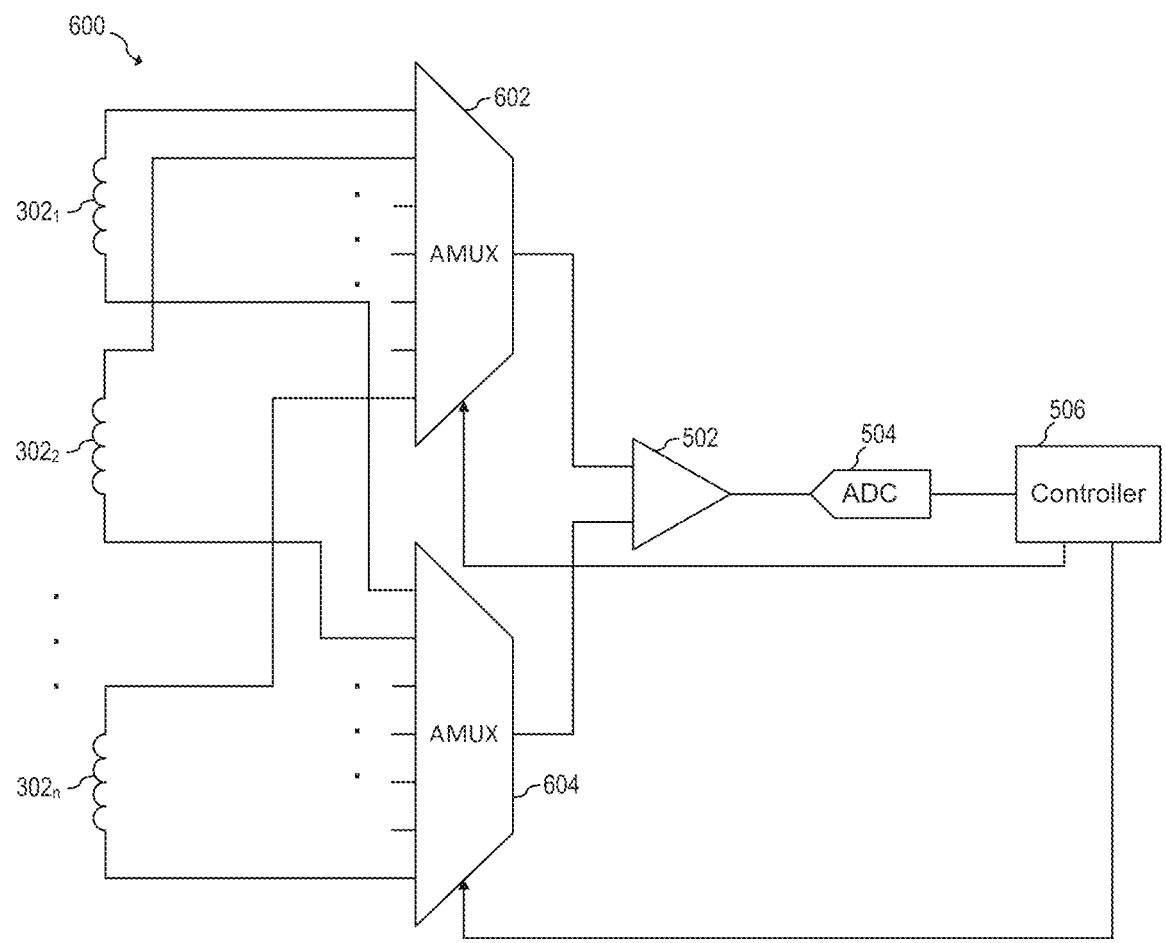
FIG. 6 shows a schematic diagram of a sensing circuit for operating the sensing coils of FIG. 3, according to an embodiment of the present invention.

In some embodiments, an amplifier 502 and ADC 504 are used for each of the sensing coils 302. In some embodiments, a single amplifier 502 and/or a single ADC 504 may be shared across two or more sensing coils 302 to determine the voltage across each of the sensing coils 302 and, e.g., control LEDs 402 based on the measured voltage. For example, FIG. 6 shows a schematic diagram of sensing circuit 600, according to an embodiment of the present invention.

Sensing circuit 600 operates in a similar manner as sensing circuit 500. Sensing circuit 600, however, includes analog multiplexers (AMUXs) 602 and 604 to share amplifier 502 and ADC 504 with n sensing coils 302.

Measuring the voltage across each of the sensing coils 302 by ADC 504 when shared may be performed in any way known in the art. For example, in some embodiments, such measurements may be performed in a round-robin configuration. Such sampling of the voltage across sensing coils 302 may be performed in a few milliseconds or less (e.g., 10 ms or less).

Controller 506 may be implemented in any way known in the art. For example, some embodiments may implement controller 506 with a general purpose controller. Other embodiments may implement controller 506 using a digital signal processor (DSP) or a field programmable gate array (FPGA). Yet other embodiments may implement controller 506 using custom logic, such as an application-specific integrated circuit (ASIC). Other implementations are also possible.

Figure 7:
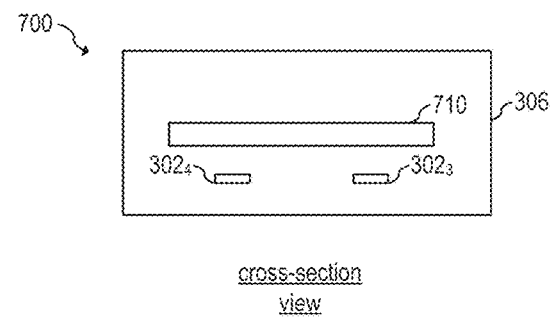
FIG. 7 shows an active alignment device that includes a receiver coil, according to an embodiment of the present invention.

In some embodiments, active alignment device 300 is powered by a battery (e.g., a Li-ion battery, AA batteries, or other types of rechargeable or non-rechargeable batteries). In some embodiments, active alignment device 300 is powered by mains (e.g., 120 VAC, 60 Hz power). In some embodiments, active alignment device 300 receives power to operate from sub-surface wireless charger 102. For example, FIG. 7 shows active alignment device 700 including receiver coil 710, according to an embodiment of the present invention.

During normal operation, active alignment device 700 turns on when active alignment device 700 wirelessly receives power from sub-surface wireless charger 102 using receiver coil 710. Active alignment device 700, therefore, may operate in a similar manner as a receiver 106 having receiver coil 110 in the presence of wireless power emanating from sub-surface wireless charger 102. Once powered, active alignment device 700 operates in a similar manner as active alignment device 300.

Figure 8:
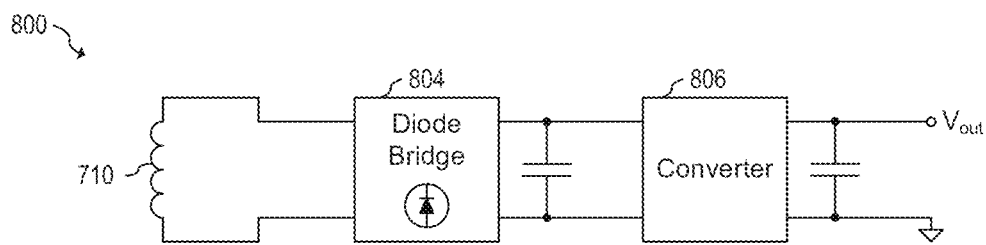
FIG. 8 shows a schematic diagram of a wireless power receiver circuit of the active alignment device of FIG. 7, according to an embodiment of the present invention.

FIG. 8 shows a schematic diagram of wireless power receiver circuit 800 of active alignment device 700, according to an embodiment of the present invention. As shown in FIG. 7, receiver coil 710 is configured to receive wireless power, e.g., from sub-surface wireless charger 102. The voltage developed across receiver coil 710 is rectified using diode rectifier bridge 804 and provided to converter 806. Converter 806 then generates DC voltage $V_{out}$, which is used to provide power to one or more circuits of active alignment device 700. In some embodiments voltage $V_{out}$ may also be used for other purposes, such as to charge a rechargeable battery of active alignment device 700.

Diode rectifier bridge 804 may be implemented in any way known in the art. Other rectification methods may also be used. For example, in some embodiments, a synchronous rectifier may be used.

Converter 806 may be implemented in any way known in the art. For example, in some embodiments, converter 806 may be implemented as a buck converter. Other implementations, such as boost, buck-boost, fly-back converters, and other switching converter topologies may also be used. In some embodiments, converter 806 may be implemented as a non-switching converter, such as an LDO.

Advantages of some embodiments include that during installation of a sub-surface wireless charger in a surface, a user may find the location that maximizes the coupling coefficient of the sub-surface wireless charging system without relying on visual observations of the location of the sub-surface wireless charger. Using an active alignment device advantageously allows a user to easily find the location of maximum coupling coefficient when the sub-surface wireless charger is installed in surfaces that are not transparent. A user may then mark the top surface of the surface at the identified location of maximum coupling coefficient to allow a user to quickly find the location of optimal wireless charging for receiver placement.

In an embodiment of the present invention, a testing device that includes a receiver coil is used to test whether a sub-surface wireless charger is capable of delivering a particular amount of wireless power once the sub-surface wireless charger is installed in a surface. The testing device includes a variable load that can be adjusted to mimic a particular power consumption, such as 10 W, for example. The testing device then measures the actual amount of wireless power received by the receiver coil, e.g., based on the voltage across the receiver coil and the current flowing through the receiver coil to determine whether the particular amount of wireless power was delivered. In some embodiments the testing device is implemented together with an active alignment device inside the same device.

Figure 9:
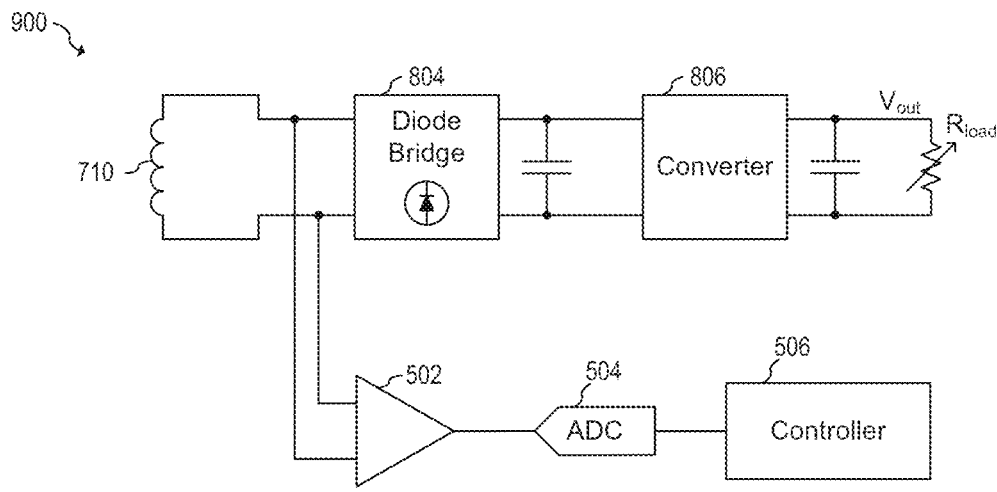
FIG. 9 shows a schematic diagram of a testing device, according to an embodiment of the present invention.

A testing device, such as active alignment devices 300 and 700 may include functionality to perform a full power test. During a full power test, the testing device aims to check whether a sub-surface wireless charger can provide the rated maximum power to a receiver. FIG. 9 shows a schematic diagram of testing device 900, according to an embodiment of the present invention. In some embodiments, testing device 900 may be implemented as a dedicated device. In other embodiments, testing device 900 may also be implemented as part of another device. For example, FIG. 9 shows testing device 900 being implemented as part of active alignment device 700.

As shown in FIG. 9, converter 806 power variable load $R_{load}$. During normal operation, variable load $R_{load}$ is configured such that testing device 900 consumes the maximum rate power that sub-surface wireless charger 102 is capable to provide. For example, if sub-surface wireless charger 102 is rated to provide 10 W, variable load $R_{load}$ is configured such that testing device 900 consumes 10 W. It is understood that the rated power of sub-surface wireless charger 102 may be different, such as higher 12 W, 15 W, 20 W, or higher, or lower, such as 8 W, 5 W, or lower.

Once testing device 900 is consuming the maximum rate power, the voltage across receiver coil 710 is amplified by amplifier 502 and then converted into digital data by ADC 504. Controller 506 receives the digital data from ADC 504 and determines if the testing device 900 is actually consuming the maximum rated power. If yes, sub-surface wireless charger 102 has passed the full power test. If not, sub-surface wireless charger 102 has failed the full power test.

Testing device 900 monitors whether full power is being received by monitoring the voltage across receiver coil 710. Some embodiments may monitor whether full power is be received by monitoring other apartments. For example, some embodiments may monitor voltage $V_{out}$, or the voltage at the output of the rectifier circuit 804. Other implementations are also possible. For example, some embodiments may monitor the voltage across one or more sensing coils 302.

Since testing device 900 is only used with high loading during a small portion of time (e.g., a few tens of milliseconds), testing device 900 may be implemented with relaxed thermal dissipation considerations, which may advantageously result in lower costs of manufacturing testing device 900.

Sub-surface wireless charger 102 is configured to provide power across surface 104. A particular model of sub-surface wireless charger may be installed in different surfaces having different thicknesses, such as tables having thicknesses of 10 mm, 15 mm, 18 mm, 20 mm, 25 mm, or more. Since the coupling coefficient decreases as the distance between transmitter coil 108 and receiver coil 110 increases, the amount of power that receiver 106 receives when receiving power across a relatively short distance (e.g., 10 mm thick surface) may be substantially larger than the amount of power that receiver 106 receives when receiving power across a relatively large distance (e.g., 20 mm thick surface). If the wireless power received by receiver 106 is too low, receiver 106 may not operate properly. If the wireless power received by receiver 106 is too high, receiver 106 may not operate properly, get damage and/or produce a safety hazard.

Sub-surface wireless charger 102 may use a ping before beginning to wirelessly transmit power to receiver 106. During the ping process, a pulse of energy is sent by sub-surface wireless charger 102. Receiver 106 receives the pulse of energy and wirelessly transmits back to sub-surface wireless charger 102 information related to the amount of power received, such as, for example, information about the voltage across receiver coil 110. Such communication from receiver 106 to sub-surface wireless charger 102 may be accomplished by using load modulation of a load coupled to receiver coil 110.

The ping process may be used, for example, to determine whether sub-surface wireless charger 102 and receiver 106 are compatible to each other, to determine whether it is safe for sub-surface wireless charger 102 to begin wirelessly charging receiver 106, and to determine the amount of power to be transmitted. For example, if during the ping process, sub-surface wireless charger 102 determines that the amount of power received by receiver 106 is too low, it may begin charging at a higher power. If during the ping process, sub-surface wireless charger 102 determines that the amount of power received by receiver 106 is too high, it may begin charging at a lower power or not begin charging.

It is possible, however, that the energy pulse sent during the ping process may be so high that risks causing damage to receiver 106 and/or produce a safety hazard. Therefore, it may be advantageous to keep the voltage produced across receiver coil 110 during an energy pulse during the ping process within an operating voltage range (e.g., between 3 V and 9 V).

Figure 10:
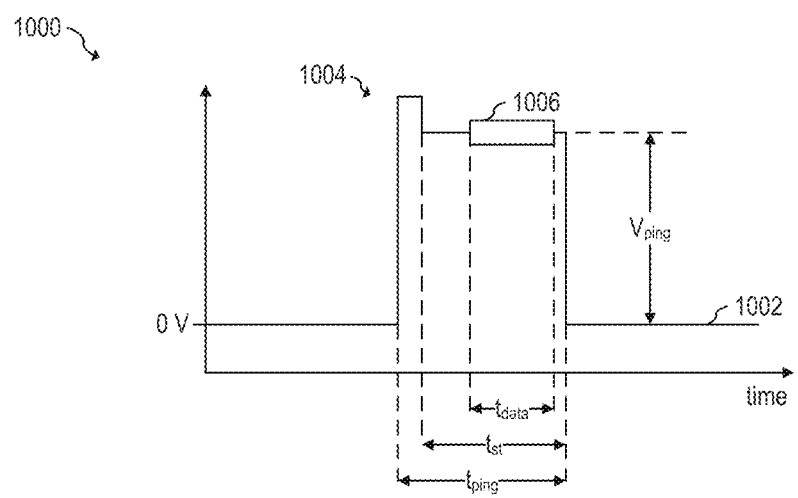
FIG. 10 shows waveforms of a voltage across the receiver coil of FIG. 7 during a ping process, according to an embodiment of the present invention.

FIG. 10 shows waveforms 1000 of a voltage across receiver coil 710 during a ping process, according to an embodiment of the present invention. Curve 1002 shows the voltage across receiver coil 710.

As shown in FIG. 10, ping energy pulse 1004 includes an overshoot portion and a steady state portion and lasts for time $t_{ping}$. During normal operation, voltage $V_{ping}$ across the receiver coil during the steady state portion of ping energy pulse 1004 is within an operating range. In some embodiments, the operating range is between 3V and 9 V. Other ranges are also possible.

During the steady state portion of ping energy pulse 1004, data may be transferred from receiver coil 710 to sub-surface wireless charger 102 during data transmission portion 1006, which lasts $t_{data}$. Data may be transmitted from receiver coil 710 to sub-surface wireless charger 102, for example, by load modulation. Such data is received by sub-surface wireless charger 102 and detected, e.g., by monitoring the voltage across transmitter coil 110. For example, load modulation may generate variations in the voltage across receiver coil 110 during the data transmission portion 1006 (e.g., at frequencies between 1 kHz and 2 kHz). Such voltage variations are inductively coupled to transmitter coil 108, which exhibits corresponding variations in the voltage across transmitter coil 108. Such variations in voltage across transmitter coil 108 may be detected by sub-surface wireless charger 102.

In an embodiment of the present invention, a programmable sub-surface wireless charger is configured to generate an initial ping having an initial default ping power that is low enough to be safe, even in situations where a receiver and the sub-surface wireless charger are very close to each other (e.g., at 5 mm or less). A testing device equipped with a high inductance receiver coil receives the initial ping and transmits to the sub-surface wireless charger a programming command to reprogram the default ping power based on the voltage measured across the receiver coil of the testing device during a calibration procedure. The sub-surface wireless charger receives the reprogrammed command and changes the default ping power from the initial default ping power to an operating default ping power, where the operating default ping power is configured to generate a voltage across a receiver coil of a receiver within safe operating limits (e.g., between 3 V and 9 V). The new default setting is written in, e.g., non-volatile memory of the sub-surface wireless charger. In some embodiments, the sub-surface wireless charger is configured to not begin wirelessly charging until the testing device successfully reprograms the sub-surface wireless charger during the calibration procedure.

Figure 11A:
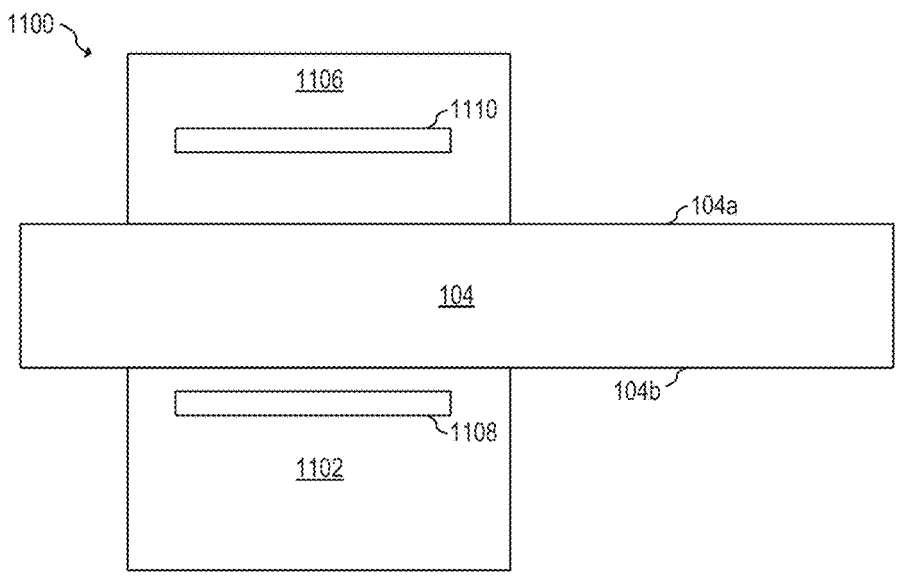
FIG. 11A shows a testing device that includes a high inductance receiver coil, and a programmable sub-surface wireless charger, according to an embodiment of the present invention.
Figure 11B:
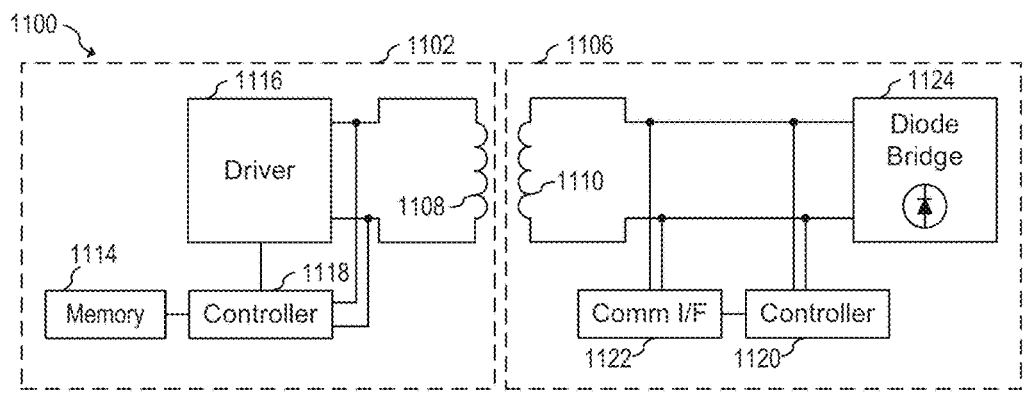
FIG. 11B shows a schematic diagram of the testing device and programmable sub-surface wireless charger of FIG. 11A, according to an embodiment of the present invention.

FIG. 11A shows testing device 1106 and programmable sub-surface wireless charger 1102, according to an embodiment of the present invention. FIG. 11B shows a schematic diagram of programmable sub-surface wireless charger 1102 and testing device 1106, according to an embodiment of the present invention. In some embodiments, testing device 1100 may be implemented as a dedicated device. In other embodiments, testing device 1100 may also be implemented as part of another device such as testing device 900 and/or active alignment device 700.

During normal operation before calibration, programmable sub-surface wireless charger 1102 defaults to producing a safe energy pulse during the ping process. For example, controller 1118 causes driver 1116 drive transmitter coil 1108 to produce a safe energy pulse having a low energy during the ping process, where the amount of energy of the safe energy pulse is stored, e.g., in non-volatile memory 1114. The safe energy pulse may have such a low energy that it is configured to produce a voltage across a receiver coil (e.g., receiver coil 110) that is smaller than a lower limit of an operating voltage range (e.g., lower than 3 V) when the thickness of surface 104 is, e.g., 20 mm. By using a safe energy pulse, programmable sub-surface wireless charger 1102 advantageously prevents a user from damaging a receiver due to inadvertently placing the receiver at a very close distance from programmable sub-surface wireless charger 1102 (e.g., such as a distance of 5 mm or closer).

During installation, a user, such as a human, may use testing device 1106 to reprogram programmable sub-surface wireless charger 1102 such that the voltage $V_{ping}$ across a receiver coil (e.g., receiver coil 110) is within the operating range (e.g., between 3 V and 9 V). To compensate for the low power of the default energy pulse, testing device 1106 includes high inductance receiver coil 1110, which increases the coupling coefficient between transmitter coil 1108 and receiver coil 1110 and advantageously allows testing device 1106 to interact with sub-surface wireless charger 1102 during a calibration process. In some embodiments, testing device 1106 is powered by programmable sub-surface wireless charger 1102 during the calibration process.

During installation, testing device 1106 performs a calibration process. The calibration process begins by having testing device 1106 placed on top surface 104a, e.g., at a location of maximum coupling coefficient. Testing device 1106 then receives the energy pulse from programmable sub-surface wireless charger 1102 via high inductance receiver coil 1110. Controller 1120 determines the voltage across high inductance receiver coil 1110, using, e.g., an ADC (not shown), and transmits data associated with the measured voltage to programmable sub-surface wireless charger 1102, e.g., during data transmission portion 1006, using, e.g., load modulation. In some embodiments, controller 1120 causes the load modulation to communicate with programmable sub-surface wireless charger 1102 using communication interface 1122.

The data transmitted from testing device 1106 to programmable sub-surface wireless charger 1102 during the data transmission portion 1006 may include, for example, the voltage measured, an identification code identifying testing device 1106 as a testing device, and a command code. In some embodiments, the command code may be used, for example, to cause programmable sub-surface wireless charger 1102 to reprogram the default amount of energy producing during the ping process such that the ping voltage $V_{ping}$ to be produced across receiver coil 106 is within a safe operating range, e.g., based on the measured voltage across receiver coil 1106. The new default energy value of the energy pulse may be stored, e.g., in non-volatile memory 1114.

Once programmable sub-surface wireless charger 1102 is reprogrammed to a new default value, a new energy pulse may be sent with the new default value. Once, e.g., testing device 1106 determines that the new default value produces a voltage across a receiver coil (e.g., such as receiver coil 110) that is within the operating range, testing device 1106 sends a command, e.g., during the data transmission portion 1006, to cause programmable sub-surface wireless charger 1102 to write into non-volatile memory 1114 the new default value.

After the calibration process, programmable sub-surface wireless charger 1102 uses the new default energy value as the energy of the pulse during a ping process during normal operation, and may operate in a similar manner as sub-surface wireless charger 102.

In some embodiments, programmable sub-surface wireless charger 1102 is configured to not begin wireless charging, even in the presence of receiver 106, until programmable sub-surface wireless charger 1102 is reprogrammed by testing device 1106 during the calibration process.

In some embodiments, programmable sub-surface wireless charger 1102 includes a DIB switch, potentiometer, or other means for a user to manually program the default value of the voltage $V_{ping}$. In such embodiments, testing device 1106 may provide an indicator, such as a visual indicator, to indicate to a user whether the voltage $V_{ping}$ is too high, too low, or acceptable.

It is understood that the high inductance value of high inductance receiver coil 1106 causes the voltage produced across high inductance receiver coil 1106 to be higher than the voltage that would have been produced across a conventional receiver coil, such as receiver coil 110. Testing device 1106 may compensate for such a difference by taking into account the difference in inductance between the high inductance receiver coil 1106 and receiver coil 110. For example, in an embodiment, the inductance value of high inductance receiver coil 1106 may be 24 µH while the inductance value of receiver coil 110 may be 8 µH. In such embodiment, the voltage measured across high inductance receiver coil 1106 may be compensated by a factor of 4 when adjusting the new default value of programmable sub-surface wireless charger 1102 such that the voltage across receiver coil 110 falls within the operating range. Other inductance values are also possible. For example, in some embodiments, receiver coil 1106 may be implemented without a high inductance coil, such as receiver coil 110.

By using a testing device and a programmable sub-surface wireless charger, some embodiments advantageously allow for producing an energy pulse during a ping process that produces a voltage across a receiver coil that is within an operating range (e.g., 3 V to 9 V). Advantageously, the same model of programmable sub-surface wireless charger may be used in surfaces of various thicknesses (e.g., from 10 mm to 25 mm) while achieving a voltage across the receiver coil that is within an operating range. Using a testing device and a programmable sub-surface wireless charger, thus, advantageously allows for causing a sub-surface wireless charger to comply with standards related to ping voltages, such as the Qi standard.

Figure 12:
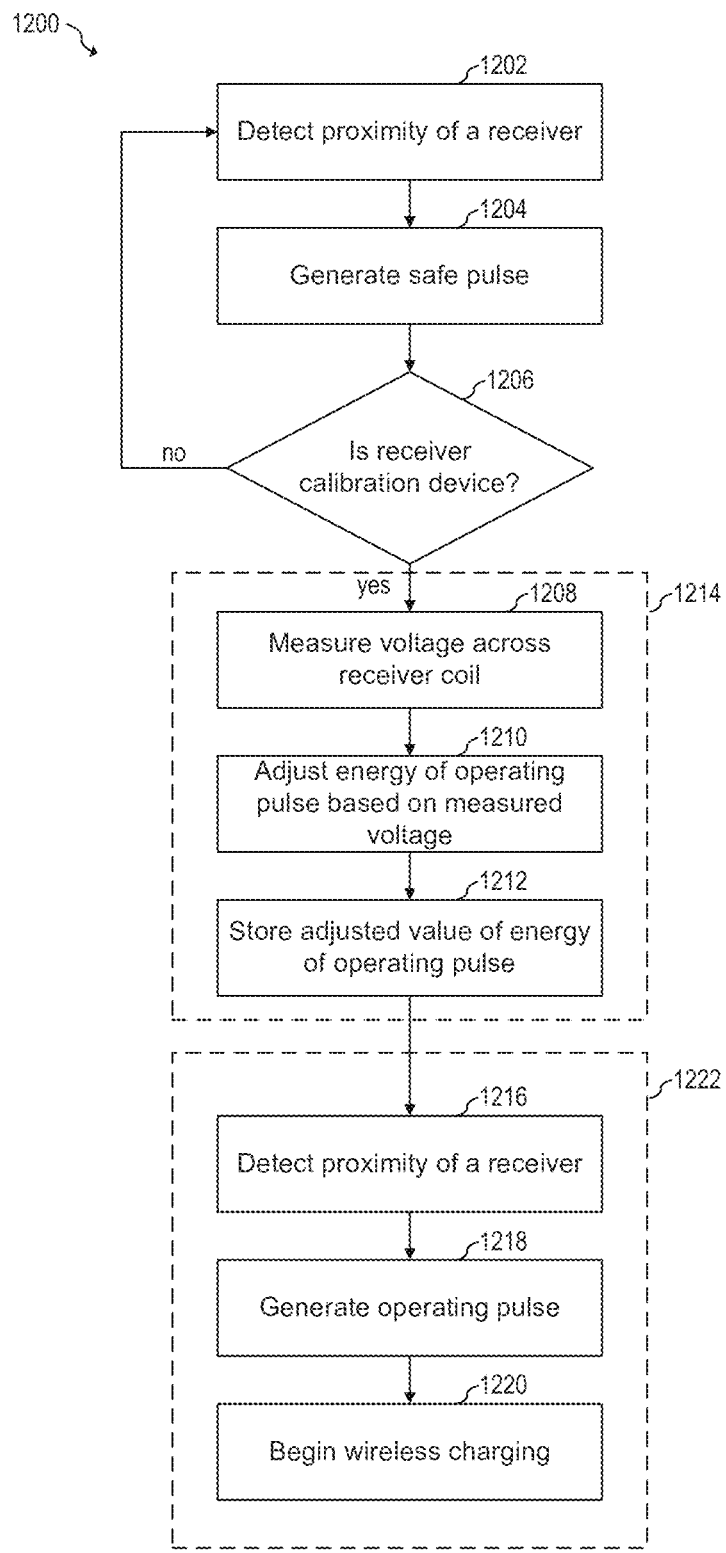
FIG. 12 shows a flowchart of an embodiment method of calibrating a programmable sub-surface wireless charger, according to an embodiment of the present invention.

FIG. 12 shows a flowchart of embodiment method 1200 of calibrating a programmable sub-surface wireless charger, according to an embodiment of the present invention. Method 1200 may be implemented, for example, by sub-surface wireless charger 1102 and testing device 1106. Other wireless chargers and receivers may implement method 1200.

As shown in FIG. 12, steps 1202, 1204 and 1206 occur prior to calibration process 1214. Calibration process 1214 includes steps 1208, 1210 and 1212. After calibration process 1214 is completed, normal operation process 1222 takes place, which includes steps 1216, 1218 and 1220.

During step 1202, a programmable sub-surface wireless charger detects the proximity of a receiver. Proximity of a receiver may be detected, for example, by detecting a change in inductance of the transmitter coil of the programmable sub-surface wireless charger. Some embodiments may detect proximity of a receiver in other ways, such as by monitoring other characteristics of the transmitter coil of the programmable sub-surface wireless charger, such as the series resistance of the transmitter coil of the programmable sub-surface wireless charger, using a sensing coil, an external sensor, or in any other way.

Once a receiver has been detected, the programmable sub-surface wireless charger generates a safe pulse having a safe energy, where the safe energy may have such a low energy that it is configured to produce a voltage across a receiver coil that is smaller than a lower limit of an operating voltage range (e.g., lower than 3 V) when the distance between the programmable sub-surface wireless charger and the receiver is higher than a minimum operating distance (e.g., higher than 15 mm).

During step 1206, the programmable sub-surface wireless charger determines whether the receiver is a calibration device or not. In some embodiments, programmable sub-surface wireless charger determines whether the receiver is a calibration device based on whether the receiver responds to the safe pulse and/or whether the receiver transmits an identification code to the programmable sub-surface wireless charger (e.g., using load modulation).

If the receiver is not a calibration device, the programmable sub-surface wireless device returns to step 1202, repeating the sequence. If the receiver is a calibration device, calibration process 1214 takes place.

During step 1208, the calibration device measures the voltage across a receiver coil of the calibration device and reports date based on such voltage measurement to the programmable sub-surface wireless charger (e.g., using load modulation). During step 1210, the programmable sub-surface wireless charger adjusts the energy value of the energy pulse based on the data received from the calibration device. In some embodiments, the programmable sub-surface wireless charger generates during step 1210 a new energy pulse with the adjusted energy value and the calibration device measures the voltages across the receiver coil of the calibration device and transmit associated data back to the programmable sub-surface wireless charger to verify that the adjusted energy value of the energy pulse causes the voltage across a receiver coil to be within operating parameters, where the adjusted energy value is higher than the energy value of the safe pulse.

Once the adjusted energy value of the energy pulse is determined, the adjusted energy value is stored in non-volatile memory during step 1212 to be used for operating pulses during the ping process of wireless charging.

After calibration process 1214 concludes, the programmable sub-surface wireless charger operates in a similar manner as sub-surface wireless charger 102, the sub-surface wireless charger detects the proximity of a receiver during step 1216, begins a ping process using an operating pulse having the adjusted energy value during step 1218, and begins wireless charging based on the ping process during step 1220.

Sub-surface wireless charger 102 is typically configured to transmit power to receiver 106 that is located at an operating distance, e.g., between 15 mm and 25 mm, such as 20 mm. During normal operation, therefore, the coupling coefficient between sub-surface wireless charger 102 and receiver 106 is typically low, such as 0.1 or 0.2. It is possible, however, that a user may bring receiver 106 into close proximity to the sub-surface wireless charger 102, such as in contact or at a distance of 1 mm or 2 mm, for example. For example, a user may detach sub-surface wireless charger 102 from surface 104 and bring receiver 106 and sub-surface wireless charger 102 into contact.

If receiver 106 and sub-surface wireless charger 102 come into very close proximity (e.g., less than 5 mm), the coupling coefficient between sub-surface wireless charger 102 and receiver 106 may increase to, e.g., 0.5, 0.8, 0.9 or higher. The voltage across receiver coil 110 caused by sub-surface wireless charger 102 when the coupling coefficient is 0.9 may be 9 times higher than the voltage across receiver coil 110 caused by sub-surface wireless charger 102 when the coupling coefficient is 0.1. Therefore, receiver 106 in such a scenario may get damage and/or create a safety hazard. Such damage may be caused by sub-surface wireless charger 102 actively transferring power to receiver 106, as well as by sub-surface wireless charger 102 generating an energy pulse during the ping process, for example.

The inductance of transmitter coil 108 may be modified when a receiver coil is in close proximity to transmitter coil 108. For example, a receiver coil that includes a ferrite material may cause the inductance of the transmitter coil to increase.

In an embodiment of the present invention, a protection circuit of a sub-surface wireless charger determines whether a receiver is unsafely close to the sub-surface wireless charger based on one or more changes in the characteristics of the transmitting coil of the sub-surface wireless charger. If it is determined that the receiver is unsafely close to the sub-surface wireless charger, the sub-surface wireless charger does not proceed with the ping process and subsequent wireless charging. The sub-surface wireless charger measures or determines the one or more characteristics of the transmitting coil by generating a protection pulse with low enough energy to be safe at very close distances, such as when the sub-surface wireless charger and the receiver are in contact with each other, and by measuring or detecting one or more properties of the oscillations that result from the protection pulse.

In some embodiments, the sub-surface wireless charger measures or determines the resonance frequency, the change in resonance frequency with respect to a predetermine resonance frequency value, the inductance of the transmitter coil, the change in inductance of the transmitter coil with respect to a predetermined inductance value, the damping factor, the change in damping factor with respect to a predetermined damping factor value, the quality factor, and/or the change in quality factor with respect to a predetermined quality factor value.

Figure 13:
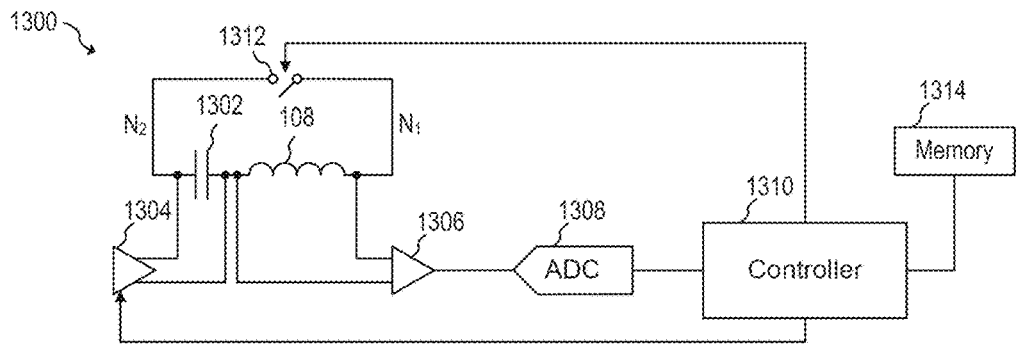
FIG. 13 shows a schematic diagram of a protection circuit of a sub-surface wireless charger, according to an embodiment of the present invention.

FIG. 13 shows a schematic diagram of protection circuit 1300 of sub-surface wireless charger 102, according to an embodiment of the present invention. Protection circuit 1300 may also be implemented in other sub-surface wireless chargers, such as programmable sub-surface wireless charger 1102, as well as other types of wireless chargers. Protection circuit 1300 includes capacitor 1302, driver 1304, amplifier 1306, ADC 1308, controller 1310, and non-volatile memory 1314. Capacitor 1302 may be used as the resonant capacitor for power transfer.

During normal operation, before beginning to transmit wireless power and before sending the energy pulse during the ping process, protection circuit 1300 determines one or more characteristics of transmitter coil 108 and then determines whether it is safe to proceed with the ping process and subsequent wireless charging. For example, in some embodiments, before beginning to transmit wireless power and before sending the energy pulse during the ping process, controller 1310 causes driver 1304 to charge capacitor 1302 (e.g., to 3 V) while switch 1312 is open. Once capacitor 1302 is charged (e.g., once capacitor 1302 reaches a predetermined voltage), controller 1310 closes switch 1312, which causes transmitter coil 108 to generate a wireless power pulse of low intensity (e.g., a protection pulse). The resonant tank that includes transmitter col 108 and capacitor 1302 then oscillates according to its resonance frequency.

Since the resonance frequency is based on the inductance of transmitter coil 108, some embodiments determine the inductance of transmitter coil 108 by measuring the resonance frequency of the oscillations caused by the protection pulse. Such inductance is then compared with a predetermined inductance stored in memory 1314 to determine whether receiver 106 is too close. If controller 1310 determines that receiver 106 is too close, it takes action, such as preventing wireless charging and the ping process to start.

Switch 1312 is configured to connect/disconnect nodes $N_1$ and $N_2$ to/from each other, as shown in FIG. 13. Switch 1312 may be implemented with a transistor, solid state relay, or in any other way known in the art. In some embodiments, a first switch coupled between node $N_1$ and ground, and a second switch coupled between $N_2$ and ground are used instead of switch 1312.

Figure 14A:
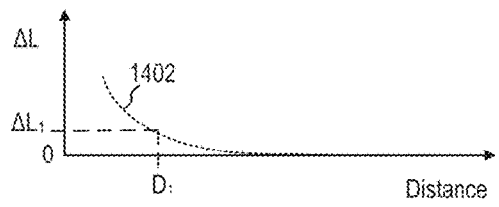
FIG. 14A shows a curve that illustrates the change in inductance of the transmitter coil of FIG. 2 versus distance between the sub-surface wireless charger and receiver of FIG. 1, according to an embodiment of the present invention.

FIG. 14A shows curve 1402 that illustrates the change in inductance ΔL of transmitter coil 108 versus distance between sub-surface wireless charger 102 and receiver 106, according to an embodiment of the present invention. The change in inductance ΔL may correspond to the difference between the measured inductance of transmitter coil 108 when receiver 106 is at a particular distance and a predetermined inductance $L_o$. In some embodiments, the predetermined inductance $L_o$ is determined during manufacturing or testing of sub-surface wireless charger 102, for example.

As shown by curve 1402, when receiver 106 is very far from sub-surface wireless charger 102, the inductance of transmitter coil 108 is equal to the predetermined inductance $L_o$. As receiver 106 gets closer to sub-surface wireless charger 102, the inductance of transmitter coil 108 increases. When inductance change ΔL is greater than threshold $ΔL_1$, controller 1310 determines that receiver 106 is too close and, e.g., prevents the ping process and subsequent charging to occur.

In some embodiments, the predetermined inductance $L_o$ is determined and stored in memory 1314 during testing or manufacturing of sub-surface wireless charger 102. It is understood that the value of $L_o$ and/or ΔL may not indicate an exact inductance value. For example, in some embodiments, another value based on the inductance, such as a resonance frequency $f_o$ that corresponds to $L_o$ may be stored in memory 1314. Other implementations are also possible.

Driver 1304 is configured to produce a voltage across capacitor 1302 and may be implemented in any way known in the art. For example, in some embodiments, an LDO or other converter or circuit may be used to charge capacitor 1302.

Controller 1310 is configured to determine whether it is safe to begin the ping process and subsequent wireless charging. In some embodiments, controller 1310 may be implemented together with a central controller of sub-surface wireless charger 102. Controller 1310 may be implemented in any way known in the art. For example, some embodiments may implement controller 1310 with a general purpose controller. Other embodiments may implement controller 1310 using a digital signal processor (DSP) or a field programmable gate array (FPGA). Yet other embodiments may implement controller 506 using custom logic, such as an application-specific integrated circuit (ASIC). Other implementations are also possible.

Figure 14B:
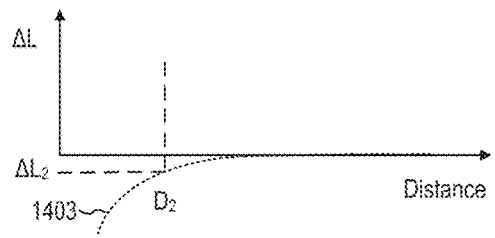
FIG. 14B shows a curve that illustrates the change in inductance ΔL of a transmitter coil versus distance between the transmitter coil and metal, according to an embodiment of the present invention.

In some embodiments, the presence of metal, e.g., from the case of a receiver, may cause the inductance of transmitter coil 108 to decrease. For example, FIG. 14B shows curve 1403 that illustrates the change in inductance ΔL of transmitter coil 108 versus distance between sub-surface wireless charger 102 and metal, according to an embodiment of the present invention. Therefore, some embodiments may prevent the ping process and subsequent charging to start when the change in inductance ΔL of transmitter coil 108 is below a second threshold $\Delta L_2$.

Some embodiments only allow the ping process to start when the change in inductance ΔL of transmitter coil 108 is below threshold $\Delta L_1$ and above the second threshold $\Delta L_2$.

Materials like aluminum typically cause a change in the inductance of transmitter coil 108 when in close proximity to transmitter coil 108. Some materials, such as iron, may not cause a big change in the inductance of transmitter coil 108 when in close proximity to transmitter coil 108. However, materials such as iron may cause the series resistance $R_s$ of transmitter coil 108 to increase, thus affecting the damping factor of the oscillations caused by the protection pulse.

In some embodiments, controller 1310 may prevent the ping process and subsequent wireless charging to start when the series resistance of transmitter coil 108 is above a predetermined threshold $R_T$. Controller 1310 may determine the series resistance Rs (or a change of series resistance ΔR) of transmitter coil 108 by determining the damping factor ζ (or a change in damping factor Δζ) of the oscillations generated by the protection pulse and/or by determining the quality factor Q (or a change in quality factor ΔQ) of the resonant tank that includes transmitter coil 108 and capacitor 1302. It is understood that predetermined values that correspond to series resistance, damping factor, quality factor, and/or resonance frequency to aid in determining the change of the corresponding series resistance, damping factor, quality factor, and/or resonance frequency may be stored in memory 1314.

In some embodiments, controller 1310 may combine information from the damping factor, quality factor, resonance frequency and/or inductance of transmitter coil 108 to determine whether or not to allow the ping process to start.

In some embodiments, controller 1310 causes a plurality of protection determinations before allowing the ping process to start. For example, in some embodiments, controller 1310 may determine at two, three, or more different times the change in inductance ΔL before determining that it is safe to start the ping process. For example, in some embodiments, controller 1310 may only allow the ping process to start when the change in inductance ΔL is between thresholds $\Delta L_1$ and $\Delta L_2$ for three consecutive protection determinations.

Although the protection determinations in this example only refers to a change in inductance, it is understood that changes in series resistance, quality factor, and/or resonance frequency may also be used.

In some embodiments, each protection determination is made every, e.g., 400 ms. Other times, such as smaller than 400 ms, higher than 400 ms are possible. In some embodiments, the time between each protection determination varies.

Advantages of some embodiments include the capability of the sub-surface wireless charger of detecting whether a receiver is unsafely close, and protecting such receiver from damage that may have been caused by beginning the ping process or wireless charging the receiver when the receiver is unsafely close. The sub-surface wireless charger is capable of detecting whether the receiver is unsafely close based on various characteristics that advantageously allow for the detection of different receivers that includes different materials, such as iron or aluminum.

Figure 15:
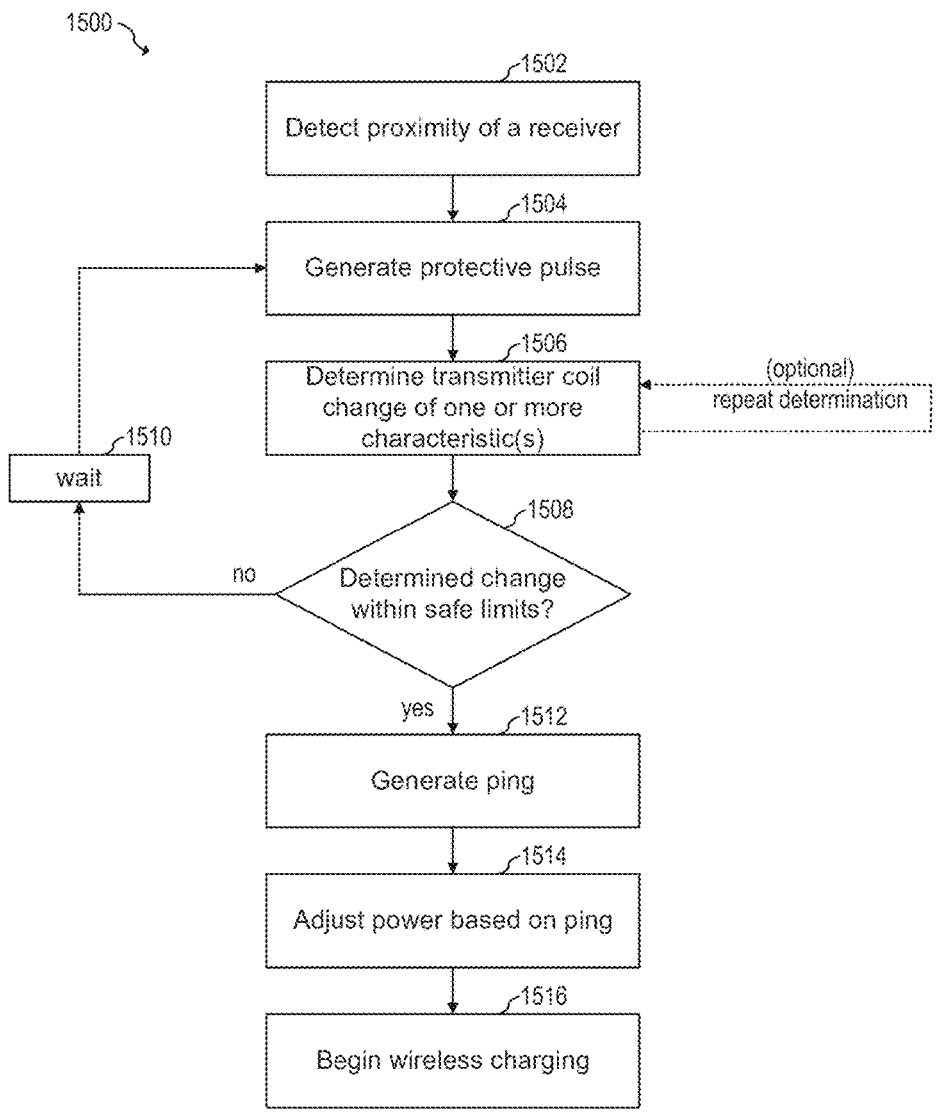
FIG. 15 shows a flowchart of an embodiment method of protecting a receiver, according to an embodiment of the present invention.

FIG. 15 shows a flowchart of embodiment method 1500 of protecting a receiver, according to an embodiment of the present invention. Method 1500 may be implemented, for example, by sub-surface wireless charger 102 or 1102. Other wireless chargers may implement method 1500.

During step 1502, a sub-surface wireless charger, such as wireless charger 102, detects the proximity of receiver 1502. Proximity may be detected, for example, by detecting a change in inductance of transmitter coil 108. Some embodiments may detect proximity of a receiver in other ways, such as by monitoring other characteristics of transmitter coil 108, such as the series resistance, using a sensing coil, an external sensor, or in any other way.

During step 1504, the sub-surface wireless charger generates a protective pulse, such as described with respect to protection circuit 1200.

During step 1506, the sub-surface wireless charger determines one or more changes in characteristics of the transmitter coil of the sub-surface wireless charger, such as transmitter coil 108. The characteristics that may be determined include a change in inductance, resonance frequency, damping factor, and/or quality factor.

In some embodiments, step 1506 may be repeated. For example, in some embodiments, step 1506 is repeated until the value of the determination does not vary (e.g., until the determination of the change in inductance ΔL is the same three consecutive times). In other embodiments, step 1506 is repeated a fixed number of times (e.g., three times). Other implementations are also possible.

The change in the one or more characteristics of the transmitter coil is compared with safe limits during step 1508. For example, in some embodiments, three consecutive determinations of the change in inductance ΔL are compared with thresholds $\Delta L_1$ and $\Delta L_2$.

If the one or more characteristics of the transmitter coil are outside the safe limits, the sub-surface wireless charger may wait during step 1510, and retest the system by generating a protective pulse during step 1504. In some embodiments, the sub-surface wireless charger may stop retesting the system after a finite number of tries, such as three, for example.

If the one or more characteristics of the transmitter coil are inside the safe limits, the sub-surface wireless charger starts the ping process, e.g., in compliance with a standard, such as the Qi standard, by generating a ping 1512. The wireless charger then adjusts the power based on the ping process during step 1514 and then begins the wireless charging during step 1516.

Figure 16:
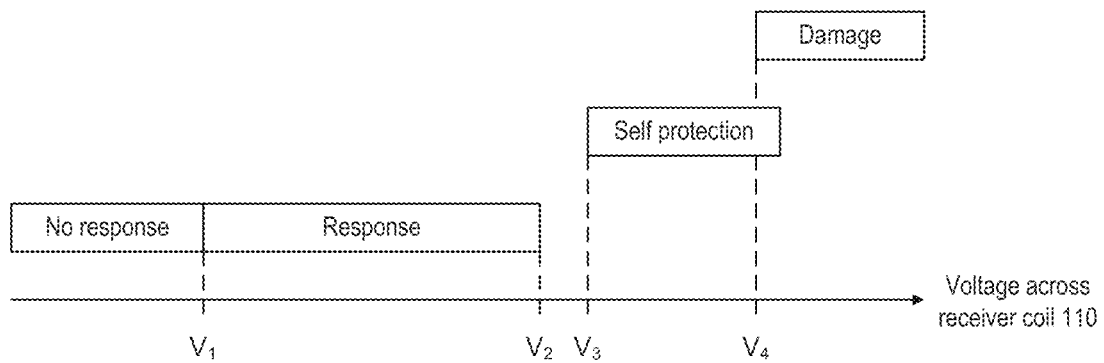
FIG. 16 shows a receiver operating during the ping process at different voltages across coil the coil of such receiver, according to an embodiment of the present invention.

A receiver, such as receiver 106, may include a protection circuit to protect receiver against damage. For example, FIG. 16 shows receiver 106 operating during the ping process at different voltages across coil 110, according to an embodiment of the present invention. When the voltage is too low (below voltage $V_1$) or to high (above voltage $V_2$), receiver 106 may not transmit any data during the data transmission portion 1006 of the ping energy pulse 1004. Between voltages $V_1$ and $V_2$, receiver 106 transmits data during the data transmission portion 1006, e.g., in accordance with a particular standard, such as the Qi standard. For voltages above voltage $V_3$, receiver 106 may self-protect, e.g., by connecting and disconnecting detuning capacitors to/from receiver coil 110 to try to limit the voltage across receiver coil 110. Above voltage $V_4$, damage may occur.

The self-protection mechanism of connecting/disconnecting detuning capacitors to/from receiver coil 110 may also occur, e.g., during wireless charging when the voltage across receiver coil 110 is higher than voltage $V_3$.

In some embodiments, voltage $V_1$ may be 3 V, voltage $V_2$ may be 15 V, voltage $V_3$ may be 16 V, and voltage $V_4$ may be 20 V. Other voltages may also be used.

In an embodiment of the present invention, a multi-ping method is used to determine whether a receiver is too close to a sub-surface wireless charger. A first ping with a first energy is generated. A second ping with a second energy is generated after the first ping, where the second energy is higher than the first energy. If the sub-surface wireless charger receives data from the receiver during the first ping but not during the second ping, it is determined that the receiver is too close to the sub-surface wireless charger.

Figure 17:
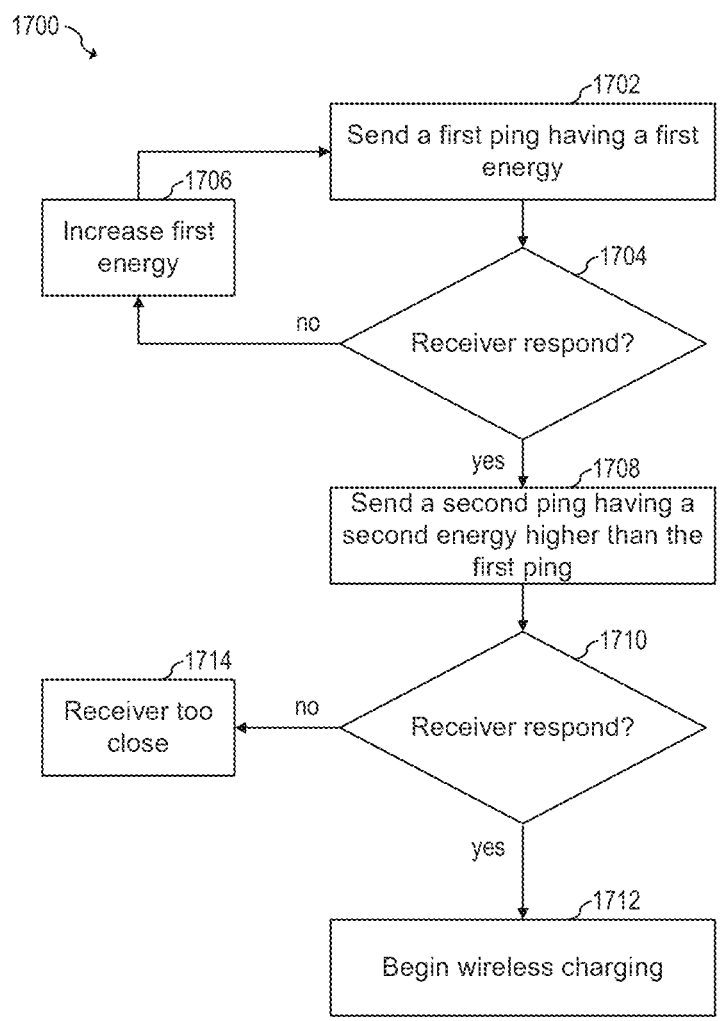
FIG. 17 shows a flowchart of an embodiment method of protecting a receiver, according to an embodiment of the present invention.

FIG. 17 shows a flowchart of embodiment method 1700 of protecting a receiver, according to an embodiment of the present invention. Method 1700 may be implemented, for example, by sub-surface wireless charger 102 or 1102. Other wireless chargers may implement method 1700.

During step 1702, a sub-surface wireless charger generates a first ping having a first energy. The initial first energy may correspond to a default ping energy, e.g., determined during calibration with testing device 1106. If the sub-surface wireless charger does not receive a response from the receiver during step 1704, the sub-surface wireless charger increases the first energy during step 170-6 and sends a new first ping during step 1702 with the increased first energy. Steps 1706 and 1702 are repeated until the receiver responds, until a maximum number of repetitions (e.g., 5) or until a maximum first energy is used). In some embodiments, the sub-surface wireless charger determines whether the receiver has responded based on whether data has been received during the data transmission portion 1006 of the ping.

If the sub-surface wireless charger receives a response from the receiver during step 1704, the sub-surface wireless charger generates a second ping having a second energy, where the second energy is higher than the first energy. During step 1710, the sub-surface wireless charger checks whether a response from the receiver has been received. If not, it is determined during step 1714 that the receiver is too close. If yes, the sub-surface wireless charger proceeds to begin wireless charging during step 1712.

Although method 1700 has been illustrated with two pings (the first ping and the second ping), more pings may be used in some embodiments.

In some embodiments, a sub-surface wireless charger determines that a receiver is too close by detecting the detuning by the receiver. The sub-surface wireless charger determines whether the receiver is performing detuning by monitoring a voltage across a transmitter coil of the sub-surface wireless charger and determining whether a signal with a frequency lower than a first frequency (e.g., 1 kHz) has a first energy higher than an energy threshold. For example, in some embodiments, an amplitude modulation of 2 $V_{pp}$ at 100 Hz across the transmitter coil is indicative of receiver detuning.

Figure 18:
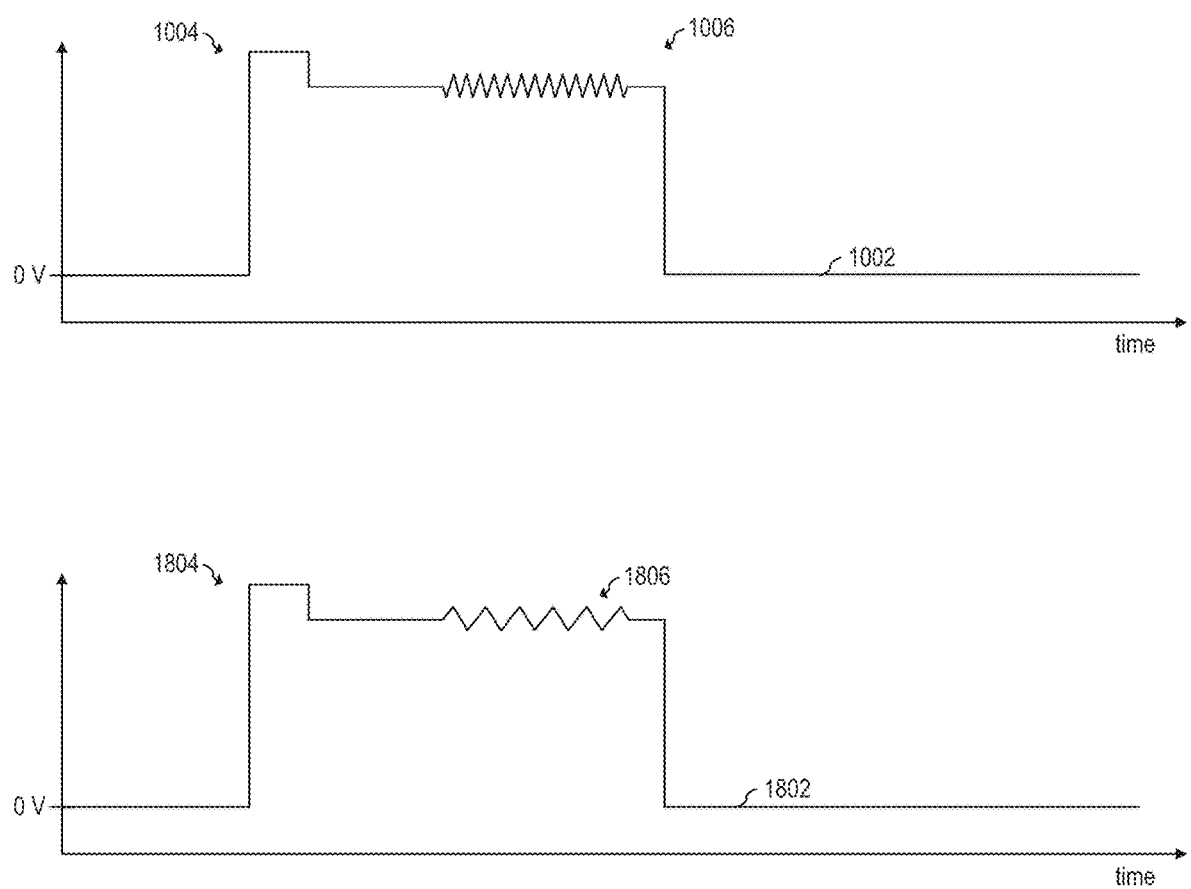
FIG. 18 shows first and second curves illustrating the voltage across a receiver coil during a ping process, with and without detuning, respectively, according to an embodiment of the present invention.

Detuning is the process by which a receiver reduces the voltage across the receiver coil by connecting and disconnecting capacitors to the receiver coil. The connecting and disconnecting the capacitors to the receiver coil modulates the voltage across the receiver coil, which in turn may be inductively coupled to the transmitter coil of the sub-surface wireless charger and may be detected by the sub-surface wireless charger. For example, FIG. 18 shows curves 1002 and 1806 illustrating the voltage across receiver coil 110 during a ping process, with and without detuning, respectively, according to an embodiment of the present invention.

As shown by curve 1002 and 1802, the frequency content during the data transmission portion 1006 during a ping process without detuning is higher than the frequency content during the data transmission portion 1806 during a ping process with detuning. For example, without detuning, the data may be modulated at frequencies between 1 kHz and 2 kHz, as shown by curve 1002. Detuning exhibits voltage variations at frequencies below 1 kHz during the data transmission portion 1806, such as frequencies between 15 Hz and 1 kHz, as shown by curve 1802.

In some embodiments, sub-surface wireless charger 102 may detected the detuning by monitoring the frequency content of the voltage across transmitter coil 108 during the time in which the data transmission portion 1006 of the ping is expected. The frequency may be determined by sampling the voltage with an ADC and performing digital computations, by performing an FFT, by measuring the time between peaks of the voltage across transmitter coil 108, by detecting zero crossings of the voltage across transmitter coil 108 and measuring the time between zero crossings, or any other way known the art. In some embodiments, sub-surface wireless charger 102 may detected the detuning by monitoring the frequency content of the voltage across transmitter coil 108 during the time in which the data transmission portion 1006 is not expected.

Figure 19:
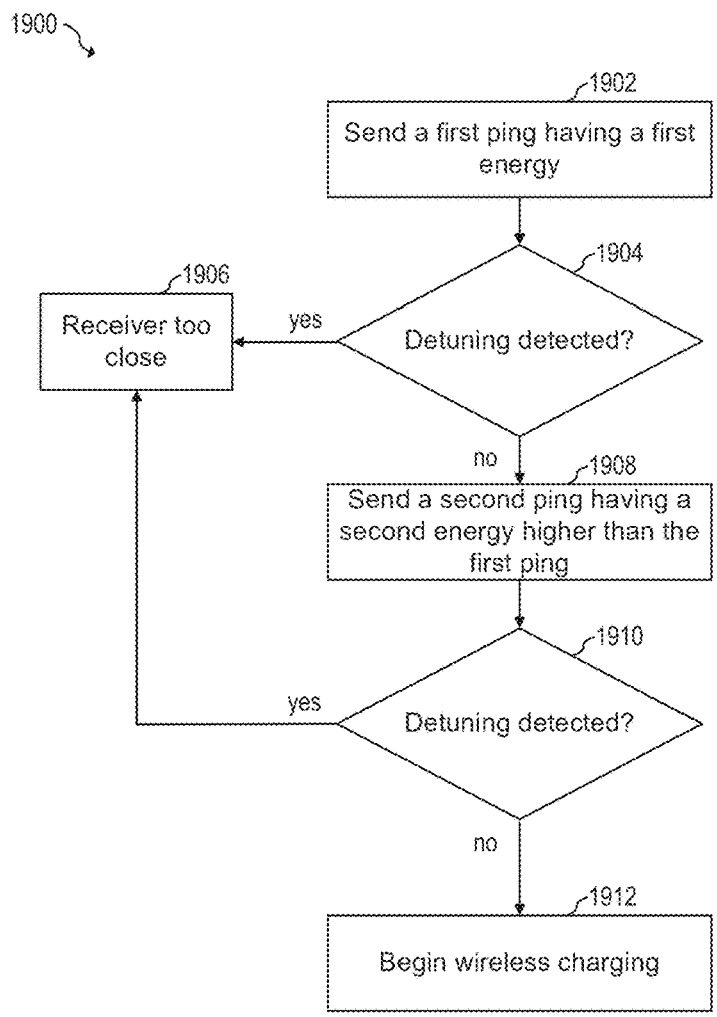
FIG. 19 shows a flowchart of an embodiment method of protecting a receiver, according to an embodiment of the present invention.

FIG. 19 shows a flowchart of embodiment method 1900 of protecting a receiver, according to an embodiment of the present invention. Method 1900 may be implemented, for example, by sub-surface wireless charger 102 or 1102. Other wireless chargers may implement method 1900.

During step 1902, a sub-surface wireless charger generates a first ping having a first energy. The initial first energy may correspond to a default ping energy, e.g., determined during calibration with testing device 1106. If the sub-surface wireless charger detects detuning (e.g., by identifying the presence of a signal with a frequency between 15 Hz and 1 kHz) during step 1904, the sub-surface wireless charger determines that the receiver is too close during step 1906.

If the sub-surface wireless charger does not detect detuning during step 1904, the sub-surface wireless charger generates a second ping having a second energy, where the second energy is higher than the first energy. During step 1910, the sub-surface wireless charger checks whether detuning is detected. If yes, it is determined during step 1906 that the receiver is too close. If no, the sub-surface wireless charger proceeds to begin wireless charging during step 1912.

In some embodiments steps 1908 and 1910 may be omitted. In other embodiments, more than two pings may be used to before step 1912.

Figure 20:
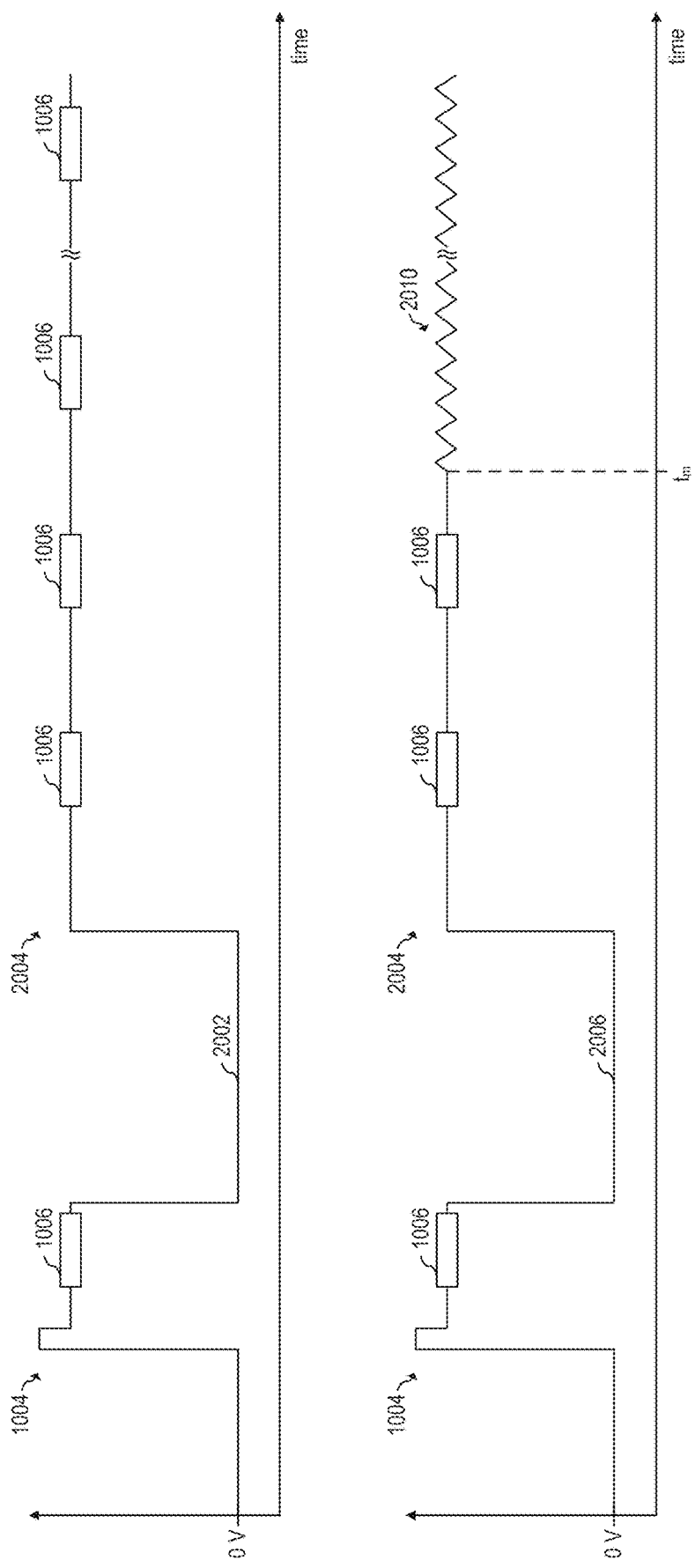
FIG. 20 shows first and second curves illustrating the voltage across a receiver coil during wireless charging, with and without detuning, respectively, according to an embodiment of the present invention.

In some embodiments, sub-surface wireless charger 102 may detect whether the receiver is too close during wireless charging by detecting detuning by receiver 106. For example, FIG. 20 shows curves 2002 and 2006 illustrating the voltage across receiver coil 110 during wireless charging, with and without detuning, respectively, according to an embodiment of the present invention. As shown by curve 2002, after the ping energy pulse 1004, sub-surface wireless charger 102 begins the wireless charging 2004. During wireless charging 2004, receiver 106 sends data to sub-surface wireless charger 102 during data transmission portion 1006. Such data may be used by sub-surface wireless charger 102 for various purposes, such as to adjust the power transfer level.

In some embodiments, if receiver 106 abruptly moves closer to sub-surface wireless charger 102 at time $t_m$, the voltage across receiver coil 110 increases and receiver 106 may self-protect by detuning, such as shown by portion 2010 of curve 2006. Sub-surface wireless charger 102 may detect such detuning and stop wireless charging.

Figure 21:
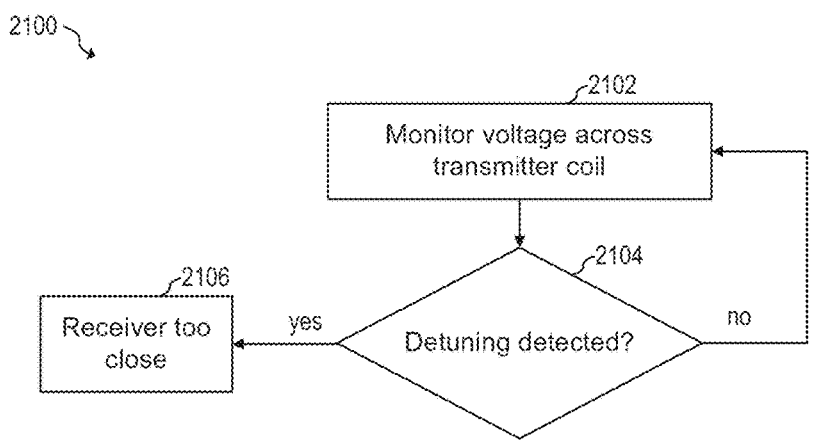
FIG. 21 shows a flowchart of an embodiment method of protecting a receiver, according to an embodiment of the present invention.

FIG. 21 shows a flowchart of embodiment method 2100 of protecting a receiver, according to an embodiment of the present invention. Method 2100 may be implemented, for example, by sub-surface wireless charger 102 or 1102. Other wireless chargers may implement method 2100.

During step 2102, a sub-surface wireless charger monitors the voltage across the transmitter coil. In some embodiments, the voltage across the transmitter coil is periodically monitored. In other embodiments, the voltage across the transmitter coil is continuously monitored. If detuning is detected during step 2104, it is determined during step 2106 that the receiver is too close, and action may be taken, such as stop wireless charging. If no detuning is detected during step 2104, the voltage across the transmitter coil is monitored, repeating the sequence.

Figure 22:
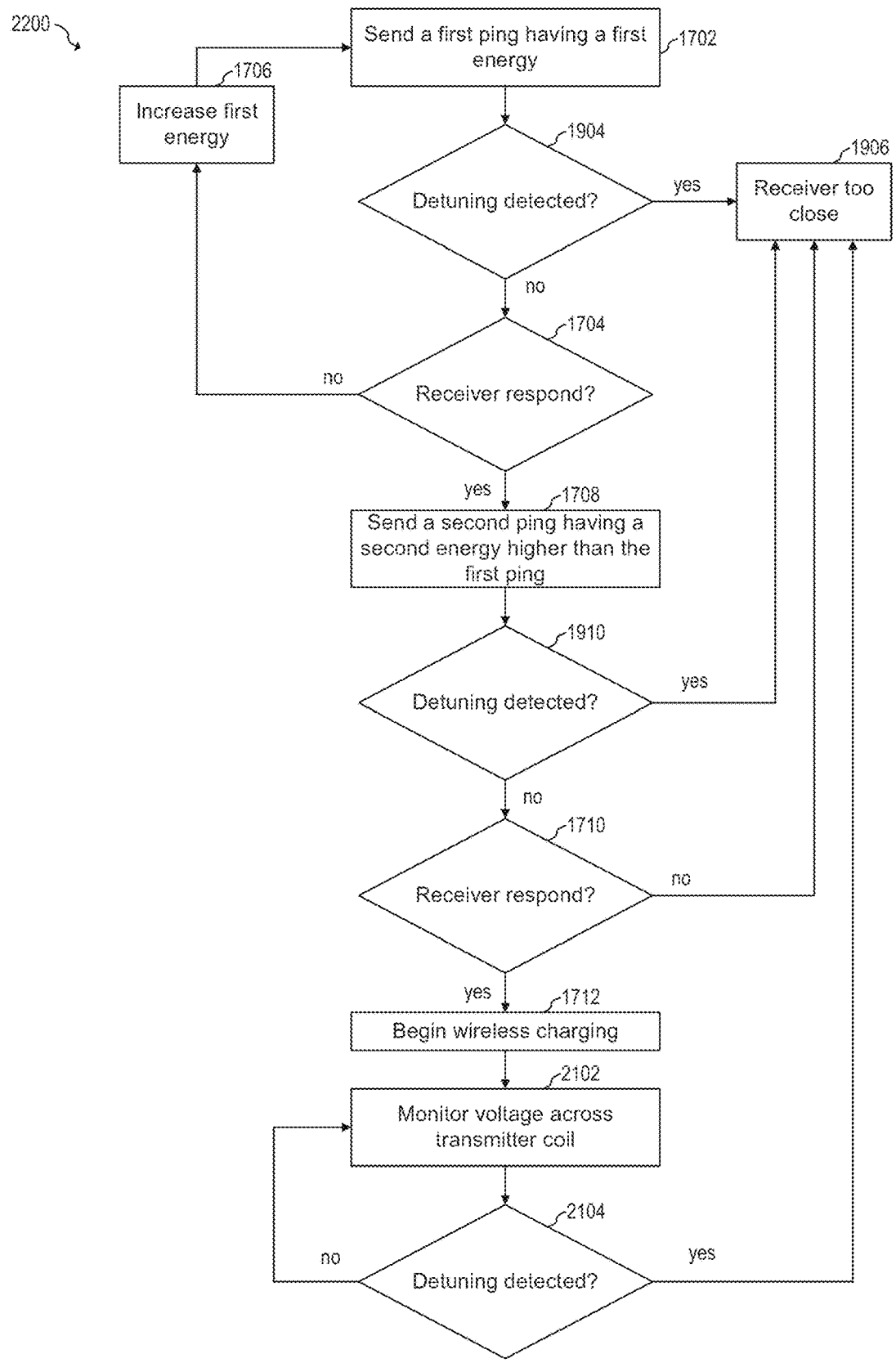
FIG. 22 shows a flowchart of an embodiment method of protecting a receiver, according to an embodiment of the present invention.

It is understood that methods 1700, 1900, and 2100 may be combined in various ways. For example, FIG. 22 shows a flowchart of embodiment method 2200 of protecting a receiver, according to an embodiment of the present invention. Method 2200 may be implemented, for example, by sub-surface wireless charger 102 or 1102. Other wireless chargers may implement method 2200. Other implementations are also possible.

In some embodiments, sub-surface wireless charger 102 may be implemented as an inductive wireless charger that transmits wireless power at, e.g., frequencies between 80 kHz and 300 kHz, such as a frequency between 110 kHz and 205 kHz, for example. In other embodiments, sub-surface wireless charger 102 may be implement as a resonant wireless charger that transmits wireless power at higher frequencies, such as frequencies higher than 1 MHz, such as 6.78 MHz or higher, for example.

In an embodiment of the present invention, a two-part wireless charger includes a sub-surface wireless charger disposed at a first surface of a surface, and a repeater charger disposed at a second surface of a surface. The sub-surface wireless charger transfers wireless power to the repeater charger and through the surface using resonance charging (e.g., at a frequency of 6.78 MHz). The repeater charger receives power from the sub-surface wireless charger and transmits wireless power to a receiver using inductive wireless charging (e.g., at a frequency between 80 kHz and 300 kHz). By using a repeater charger, the two-part wireless charger is advantageously capable to provide wireless power to a receiver when the surface is relatively thick (e.g., thicker than 20 mm, such as 25 mm, 30 mm, or thicker). The repeater charger also allows for limiting the exposure of the receiver to magnetic field to just a limited area, thus, advantageously preventing heating of the metal enclosure or other metallic elements in the vicinity of the receiver coil.

FIG. 23 shows a schematic diagram of sub-surface wireless charging system 2300 that includes two-part wireless charger 2302, according to an embodiment of the present invention. Two part wireless charger 2302 includes sub-surface wireless charger 2304 and repeater charger 2306.

During normal operation sub-surface wireless charger 2304 transmits wireless power to repeater charger 2306. Repeater charger 2306 receives the wireless power from sub-surface wireless charger 2304 and transmits wireless power to receiver 106. Receiver 106 receives wireless power, e.g., in a similar manner as described with respect to FIG. 1.

By using repeater charger 2306, two-part wireless charger 2302 is advantageously capable to transmit wireless power at distances of, e.g., 30 mm, or higher. For example, in some embodiments, two part wireless charger 2302 is capable of efficiently wirelessly transfer power across surface 104 when thickness $d_1$ is 30 mm or higher. For example, in some embodiments, two part wireless charger 2302 transfer power across surface 104 when thickness $d_1$ is 30 mm at an efficiency higher than 50%.

In some embodiments, sub-surface wireless charger 2304 operates as a resonant wireless charger at a first frequency and repeater charger 2306 receives the wireless power from sub-surface wireless charger 2304 at the first frequency and generates wireless power at a second frequency lower than the first frequency while operating as an inductive wireless charger. In such embodiments, receiver 106 receives wireless power from repeater charger 2306 at the second frequency. In some embodiments, the first frequency is 6.78 MHz and the second frequency is between 80 kHz and 300 kHz. Other frequencies may also be used.

FIGS. 24 and 25 show transmitter coil 2402 of sub-surface wireless charger 2304 and repeater coils 2502 and 2504 of repeater charger 2306, respectively, according to an embodiment of the present invention. Specific winding details are omitted for clarity purposes Transmitter coil 2402 may implemented as planar coil, such as a PCB antenna. Other implementations, such as using stamped metal, or Litz wires may also be used.

In some embodiments, ferrite layer 2404 may be disposed below at least portions of transmitter coil 2402 or all of transmitter coil 2402. In some embodiments, ferrite layer 2404 is used to increase the coupling coefficient between transmitter coil 2402 and repeater coil 2502, which may aid in efficient wireless transfer of energy. In some embodiments, ferrite layer 2404 may be much thinner than 1 mm, such as 0.1 mm or lower. Using a very thin ferrite layer 2404 in combination with a thin planar transmitter coil 2404 (such as implemented as traces in a PCB) advantageously allows for a low profile implementation (e.g., profile $P_1$ being less than 2 mm thick, such as 1 mm thick, or lower) of transmitter coil 2402 and ferrite layer 2404.

As shown by FIG. 24, transmitter coil 2402 may have a square shape when viewed from the top. Other shapes, such as rectangular, circular, octagonal, or others, such as hollow shapes, including circular or oval ring shapes, hollow square shapes, hollow rectangular shapes, and others, may also be used.

As shown in FIG. 25, repeater charger 2306 includes repeater coils 2502 and 2504. Repeater coil 2502 is configured to receive power from transmitter coil 2402. The power received by repeater coil 2502 is used to power the transmission of wireless power by repeater coil 2504.

In some embodiments, ferrite layer 2508 may be disposed on top of at least portions of repeater coil 2502 or all of repeater coil 2502. In some embodiments, ferrite layer 2508 is used to increase the coupling coefficient between transmitter coil 2402 and repeater coil 2502, which may aid in efficient wireless transfer of energy.

Repeater coil 2502 may have a hollow square shape when viewed from the top. Other hollow shapes, such as circular or oval ring shapes, hollow rectangular shapes, may also be used.

In some embodiments, the outer perimeter of repeater coil 2502 (e.g., the outer perimeter of the square ring shape of repeater coil 2502) may be equal to the outer perimeter of transmitter coil 2402 (e.g., the perimeter of the square shape of transmitter coil 2402). In other embodiments, the outer perimeter of repeater coil 2502 may be different (e.g., longer or shorter) than the outer perimeter transmitter coil 2402.

Repeater coil 2504 may have a circular shape when viewed from the top. Other shapes, such as oval, square, rectangular, octagonal, or others, as well as hollow shaped, such as circular ring shapes, oval ring shapes, or hollow square, rectangular or octagonal shapes may also be used.

In some embodiments, ferrite layer 2506 may be disposed below at least portions of repeater coil 2504 or all of repeater coil 2504. In some embodiments, ferrite layer 2506 is used to increase the coupling coefficient between repeater coil 2504 and receiver coil 110, which may aid in efficient wireless transfer of energy.

FIG. 26 shows a schematic diagram of sub-surface wireless charging system 2600, according to an embodiment of the present invention. Sub-surface wireless charging system 2300 may be implemented as sub-surface wireless charging system 2600.

During normal operation, transmitter coil 2402 transmits power to repeater coil 2502 using resonant wireless charging at a frequency of, e.g., 6.78 MHz. Repeater charger 2406 receives power from transmitter coil 2402 using repeater coil 2502 and rectifies it using diode bridge rectifier 2602. Driver 2604 receives power from diode bridge rectifier 2602 and drives repeater coil 2504. Repeater coil 2504 transmits power to receiver coil 110 using inductive wireless charging at a frequency, e.g., between 80 kHz and 300 kHz. Receiver 106 receives power from repeater coil 2504 using receiver coil 110.

Diode rectifier bridge 2602 may be implemented in any way known in the art. Other rectification methods may also be used. For example, in some embodiments, a synchronous rectifier may be used.

Driver 2604 may be implemented in any way known in the art. For example, in some embodiments, driver 2604 may be implemented with a half bridge. In other embodiments, a full bridge may be used. In some embodiments, driver 2604 may operate as a class-E amplifier. Other implementations are also possible.

Figure 27:
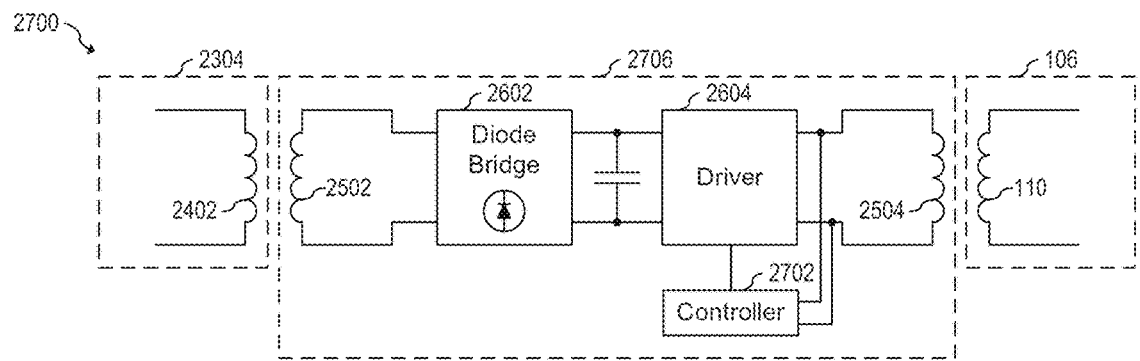
FIG. 27 shows a schematic diagram of a sub-surface wireless charging system, according to an embodiment of the present invention.

In some embodiments, repeater charger 2306 includes a controller that is used to demodulate data from receiver 106 and to control the power that is wirelessly transmitted to receiver 106. For example, FIG. 27 shows a schematic diagram of sub-surface wireless charging system 2700, according to an embodiment of the present invention. Sub-surface wireless charging system 2300 may be implemented as sub-surface wireless charging system 2700. Sub-surface wireless charging system 2700 may operate in a similar manner as sub-surface wireless charging system 2600.

As shown in FIG. 27, repeater charger 2706 includes controller 2702. During normal operation, controller 2702 demodulates data from receiver 106, e.g., such as data received during data transmission portion 1006. Controller 2702 then uses such data to adjust the amount of power transmitted by repeater coil 2504. For example, if receiver 106 sends to repeater charger 2706 indicating that the voltage across receiver coil 110 is too high, controller 2702 then causes driver 2604 to reduce the amount of power transmitted by repeater coil 2504.

In some embodiments, controller 2702, in response to a request by receiver 106 to increase/decrease power, e.g., received during data transmission portions 1006, adjusts the frequency at which power is transmitted by repeater coil 2504. In some embodiments, controller 2702 instead of, or in addition to adjusting the frequency at which power is transmitted by repeater coil 2504, causes driver 2604 to adjust the voltage at which it drives transmitter coil 2504.

In some embodiments, controller 2702 implements foreign object detection (FOD). For example, in some embodiments, controller 2702 determines the average power transmitted by repeater coil 2504 and compares it with the average power received by receiver coil 110. If the power difference between the transmitter power and the received power is higher than a threshold, controller 2702 determines that a foreign object (e.g., a metallic foreign object) is present and takes action, such as reducing the power transmitted by repeater coil 2504 or stopping wireless charging.

Figure 28:
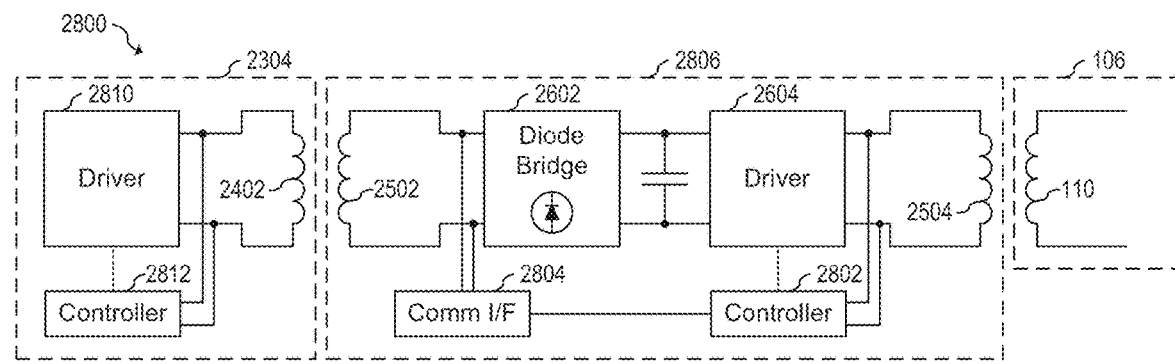
FIG. 28 shows a schematic diagram of a sub-surface wireless charging system, according to an embodiment of the present invention.

In some embodiments, a repeater charger includes a controller that requests sub-surface wireless charger 2304 to adjust the power transmitted by transmitter coil 2402 based on data that receiver 106 sends via receiver coil 110. For example, FIG. 28 shows a schematic diagram of sub-surface wireless charging system 2800, according to an embodiment of the present invention. Sub-surface wireless charging system 2300 may be implemented as sub-surface wireless charging system 2800. Sub-surface wireless charging system 2800 may operate in a similar manner as sub-surface wireless charging system 2700.

As shown in FIG. 28, repeater charger 2806 includes controller 2802 and communication interface 2804. During normal operation, controller 2802 demodulates data from receiver 106, e.g., such as data received during data transmission portion 1006. Controller 2802 then communicates some or all of the data received from receiver 106 to sub-surface wireless charger 2304 to cause sub-surface wireless charger 2404 to adjust the amount of power transmitted from transmitter coil 2402 to repeater coil 2502 based on data sent by receiver 106 via transmitter coil 110. In such embodiments, controller 2812 of sub-surface wireless charger 2304 demodulates data received by transmitter coil 2402 from repeater coil 2502 and causes driver 2812 of sub-surface wireless charger 2304 to adjust the power transmitted by transmitter coil 2402 based on such data.

In some embodiments, controller 2802 may also use data received from receiver 106 to adjust the amount of power transmitted by repeater coil 2504 in a similar manner as controller 1702.

In some embodiments, controller 2802 may implement FOD detection in a similar manner as controller 2702. In some embodiments, when controller 2802 determines that a foreign object is present, controller 2802 transmits data indicative of the presence of a foreign object to sub-surface wireless charger 2304 via communication interface 2804, e.g., to cause sub-surface wireless charger 2304 to reduce the amount of power transmitted by transmitter coil 2402 or to stop wireless charging (e.g., using controller 2812 and driver 2810).

Communication interface 2804 is configured to transmit data to transmitter coil 2402 via repeater coil 2502 using, e.g., data modulation.

Figure 29:
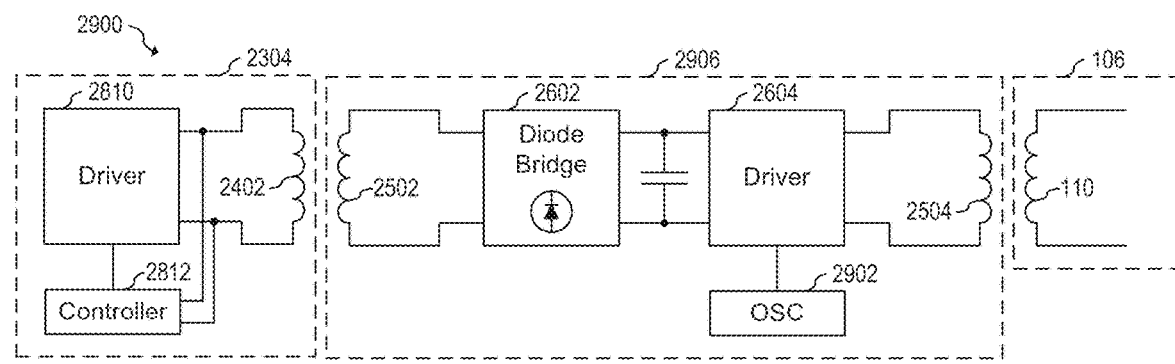
FIG. 29 shows a schematic diagram of a sub-surface wireless charging system, according to an embodiment of the present invention.

In some embodiments, a repeater charger does not include a micro-controller. For example, FIG. 29 shows a schematic diagram of sub-surface wireless charging system 2900, according to an embodiment of the present invention. Sub-surface wireless charging system 2300 may be implemented as sub-surface wireless charging system 2900. Sub-surface wireless charging system 2900 may operate in a similar manner as sub-surface wireless charging system 2600.

As shown in FIG. 29, repeater charger 2906 includes oscillator 2902. During normal operation, repeater charger transmits wireless power using repeater coil 2504 without actively controlling the amount of power transmitted by repeater coil 2504. For example, driver 2604 may drive repeater coil 2504 at a switching frequency based on oscillator 2902 and at a voltage that is based on the voltage received from diode bridge 2602.

When receiver 110 transmits data via receiver coil 110 during data transmission portion 1006, e.g., using load modulation, such data is propagated through repeater coil 2504, driver 2604, and diode bridge rectifier 2602, causing a signal modulation in repeater coil 2502, which in turn causes a signal modulation in transmitter coil 2402. Such signal modulation in transmitter coil 2402 is received by a controller of sub-surface wireless charger 2304 (not shown), which demodulates data received by transmitter coil 2402 from repeater coil 2502 and causes a driver of transmitter coil 2402 (not shown) to adjust the power transmitted by transmitter coil 2402 based on such data.

It may be advantageous to implement FOD in a sub-surface wireless charger, e.g., for safety reasons. In a sub-surface wireless charger, such as sub-surface wireless charger 102, FOD may be implemented for example, by determining the average power transmitted by transmitter coil 108, determining the amount of power received by receiver coil 110, and if the difference between the transmitted power and the receiver power is greater than a threshold, a foreign object is detected.

When sub-surface wireless charger 102 is implemented as an inductive charger (e.g., generating power at frequencies between 80 kHz and 300 kHz), sub-surface wireless charger 102 may determine the average power transmitted by transmitter coil 108 by measuring or determining the voltage across transmitter coil 108 and the current flowing through transmitter coil 108. Since coupling coefficient of sub-surface wireless charger 102 may be small (e.g., lower than 0.2), and because the voltage across transmitter coil 108 and the current flowing through transmitter coil 108 may be out of phase, the magnitude of the voltage across transmitter coil 108 and the current flowing through transmitter coil 108 are generally big. For example, when sub-surface wireless charge 102 is transmitting 15 W to receiver 106, the peak voltage across transmitter coil 106 may be 600 $V_{pp}$ and the peak current flowing through transmitter coil 106 may be 40 $A_{pp}$.

In an embodiment of the present invention, a sub-surface wireless charger is disposed below a bottom surface of a surface. An FOD unit disposed at a top surface of a surface and having a sensing coil determines an average power at the top surface of the surface and transmits such information to the sub-surface wireless charger. The sub-surface wireless charger then determines whether a foreign object is present in the charging space when a difference between the average power determined by the FOD unit and the average power received by receiver 106 is greater than a threshold. Since the voltage/current induced across the sensing coil of the FOD unit is smaller than the voltage/current at the transmitter coil of the sub-surface wireless charger, the FOD advantageously determines the average power without measuring high voltages or currents. Avoiding measuring high voltage or currents to determine the average power may advantageously increase the accuracy of the measurement of the average power.

Figure 30:
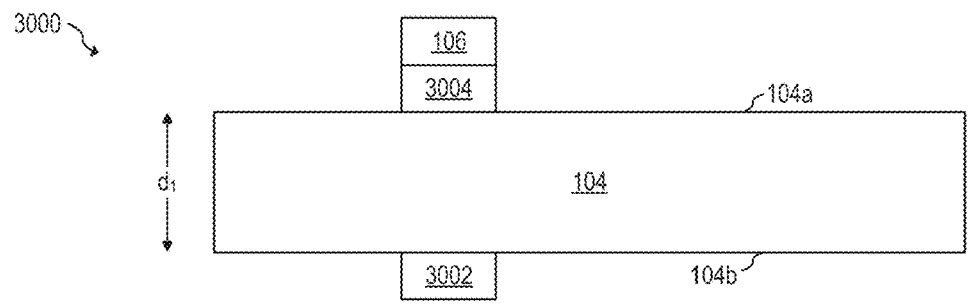
FIG. 30 shows a schematic diagram of a sub-surface wireless charging system, according to an embodiment of the present invention.

FIG. 30 shows a schematic diagram of sub-surface wireless charging system 3000, according to an embodiment of the present invention. Sub-surface wireless charging system 3000 includes sub-surface wireless charger 3002 and FOD unit 3004. Sub-surface wireless charger 3002 may operate in a similar manner as sub-surface wireless charger 102 or 1102.

During normal operation, FOD unit 3004 measures or determines the average power at top surface 104*a*, e.g., by measuring the voltage across a sensing coil of FOD unit 3004 (not shown) and the current flowing through the sensing coil. FOD unit 3004 then transmits information indicative of the average power available at top surface 104*a* to sub-surface wireless charger 3002 using, e.g., load modulation.

Since surface 104 generally does not include metallic objects, in some embodiments, determining whether a foreign (metallic) object is within the charging space includes only determining whether a foreign object is between FOD unit 3004 and receiver 106. Such determination may be performed by determining the average power available at FOD unit 3004, and comparing it with the average power received by receiver coil 110. If the power difference between the power available at FOD unit 3004 and the power received by receiver coil 110 is higher than a threshold, it is determined that a foreign object is within the charging space of sub-surface wireless charging 3002.

In some embodiments, FOD 3004 includes a mark to aid in finding the location of a maximum coupling coefficient between transmitter coil 3006 and receiver coil 110.

Figure 31:
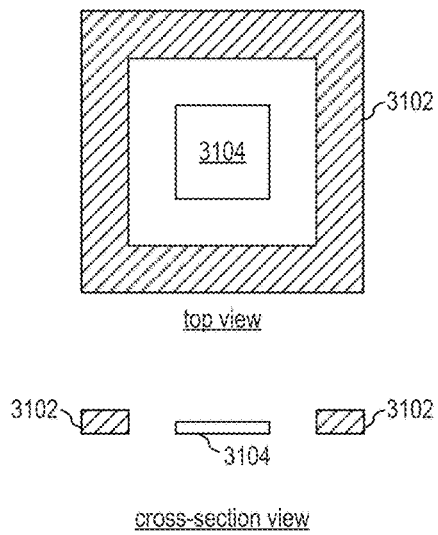
FIG. 31 shows a sensing coil and a circuit of the FOD unit of FIG. 30, according to an embodiment of the present invention.

FIG. 31 shows sensing coil 3102 and circuit 3104 of FOD unit 3004, according to an embodiment of the present invention. Specific winding details are omitted for clarity purposes.

As shown in FIG. 31, the sensing coil may have a hollow square shape when viewed from the top. Other hollow shapes, including circular or oval ring shapes, hollow rectangular shapes, and others, may also be used.

Circuit 3104 is configured to measure the available average power at FOD unit 3004 based on voltage across sensing coil 3102 and current flowing through sensing coil 3102 and transmits such information back to sub-surface wireless charger 3002 using, e.g., load modulation. Circuit 3104 may be implemented with a PCB, flex PCB, for example. Although FIG. 31 shows circuit 3104 implemented in a square area, other implementations, are also possible.

Figure 32:
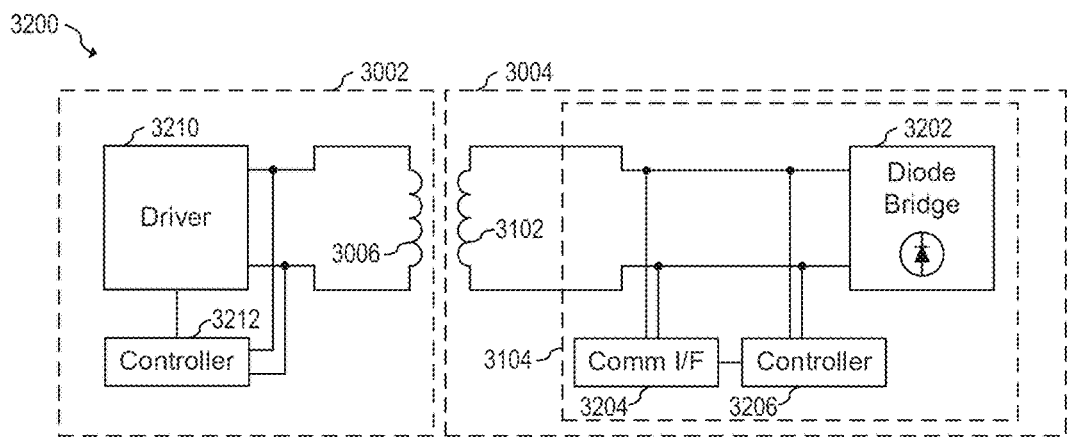
FIG.32 shows a schematic diagram of the sub-surface wireless charging system of FIG. 30, according to an embodiment of the present invention.

FIG. 32 shows a schematic diagram of sub-surface wireless charging system 3000, according to an embodiment of the present invention. As shown in FIG. 32, transmitter coil 3006 of sub-surface wireless charger 3002 transmits power. The power transmitted by transmitter coil 3006 is received by receiver coil 110 (not shown). Receiver 106 communicates with sub-surface wireless charger 3002 by, e.g., using load modulation. Sub-surface wireless charger 3002 receives information, such as power received by receiver 106, and controls wireless charging based on such information, e.g., in a similar manner as sub-surface wireless charger 102 or 1102, for example.

The power transmitted by transmitter coil 3006 is also received by sensing coil 3102. Such power is used to power controller 3206 and communication interface 3204 via, e.g., diode bridge 3202, and possibly a converter (not shown), such as an LDO, for example.

During normal operation, controller 3206 determines the average power available at the location of sensing coil 3102 by measuring the voltage across sensing coil 3102 and the current flowing through sensing coil 3102 using, e.g., an amplifier (not shown), and an ADC (not shown), for example. Controller 3206 then communicates with sub-surface wireless charger 3002 by modulating the load in accordance with the information to be transmitted (e.g., containing the measured average power).

Such load modulation creates variations in the voltage/current flowing through sensing coil 3102 which are coupled to transmitter coil 3006 and are demodulated by controller 3212 of sub-surface wireless charger 3002. Since sub-surface wireless charger 3002 is also received information from receiver 106 about power being received by receiver 106, e.g., by load modulation, sub-surface wireless charger 3002 is advantageously capable of detecting foreign objects between top surface 104a and receiver 106 without monitoring voltages and current at transmitter coil 3006.

Figure 33:
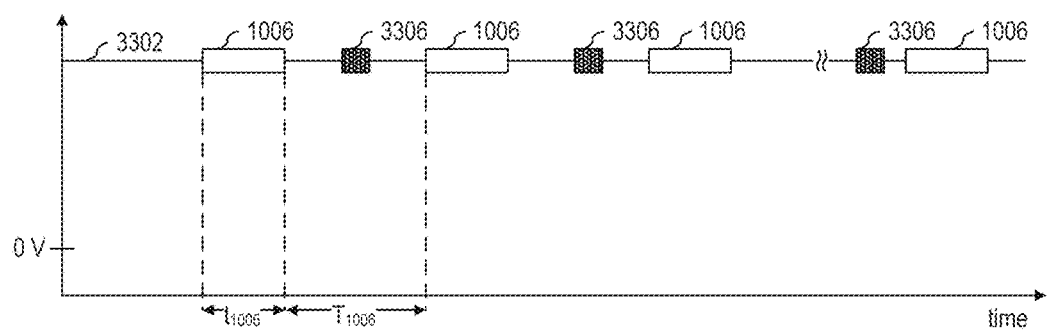
FIG. 33 shows a curve illustrating communication between the FOD unit and the receiver, and the sub-surface wireless charger of FIG. 30, according to an embodiment of the present invention.

FIG. 33 shows curve 3302 illustrating communication between FOD unit 3004 and receiver 106, and sub-surface wireless charger 3002, according to an embodiment of the present invention.

As shown by curve 3302, communication between receiver 106 and sub-surface wireless charger 3002 during wireless charging occurs during the data transmission portion 1006 (e.g., at frequencies between 1 kHz and 2 kHz). The time $t_{1006}$ of each data transmission portion 1006 may be, for example, between 1 ms and 25 ms. Longer times or shorter times are also possible.

The time $T_{1006}$ between each data transmission portion 1006 may be, for example, between 7 ms and 250 ms. Longer times or shorter times are also possible.

In an embodiment of the present invention, FOD unit 3004 performs load modulation to communicate with sub-surface wireless charger 3002 during FOD data transmission time 3306 in between data transmission portions 1006. For example, in some embodiments, FOD unit 3004 monitors the time between data transmission portions 1006 by monitoring the voltage across sensing coil 3102. For example, when the voltage across sensing coil 3102 varies at frequencies, e.g., between 1 kHz and 2 kHz, receiver 106 is communicating with sub-surface wireless charger 3002 during a data transmission portion 1006. When the voltage across sensing coil 3102 does not vary at frequencies, e.g., between 1 kHz and 2 kHz, receiver 106 is not communicating with sub-surface wireless charger 3002. FOD unit 3004, then, performs load modulation to communicate with sub-surface wireless charger 3002 during FOD data transmission time 3306 in between data transmission portions 1006.

Figure 34:
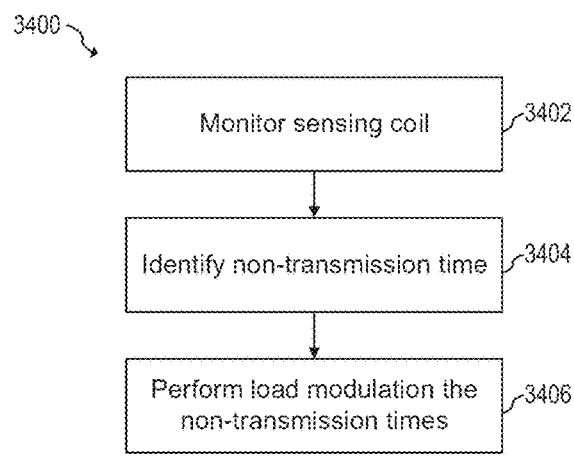
FIG. 34 shows a flowchart of an embodiment method of communicating with a sub-surface wireless charger when the sub-surface wireless charger is communicating with a receiver, according to an embodiment of the present invention.

FIG. 34 shows a flowchart of embodiment method 3400 of communicating with a sub-surface wireless charger when the sub-surface wireless charger is communicating with a receiver, according to an embodiment of the present invention. Method 3400 may be implemented, for example, by FOD unit 3004. Other devices may also implement method 3400.

During step 3402, a first device having a sensing coil, such as FOD unit 3004, located in the charging space of a sub-surface wireless charger, monitors the sensing coil to detect data transmissions between a receiver and the sub-surface wireless charger. In some embodiments, the first device measures the voltage across the sensing coil and performs FFT to determine whether data transmission is occurring based on the frequencies present in the voltage across the sensing coil. For example, in some embodiments, data transmission causes the voltage across the sensing coil to vary at frequencies between 1 kHz and 2 kHz. In such embodiments, the first device determines that data transmission is occurring when frequencies between 1 kHz and 2 kHz are present in the voltage across the sensing coil.

During step 3404, the first device identifies times of non-transmission. For example, in some embodiments, the first device determines the time between data transmissions by starting a timer when a data transmission ends and stops the timer when a new data transmission begins. The resulting time being the time of non-transmission. In other embodiments, the first device uses a time stamp and compares the time stamp with an RTC clock, for example. Other implementations are also possible.

During step 3406, the first device communicates with the sub-surface wireless charger by performing load modulation using the sensing coil during the identified non-transmission times. For example, in some embodiments, the first device performs load modulation for a fixed amount of time, beginning a second time after the data transmission between the receiver and the sub-surface wireless charger ends. Other implementations are also possible.

A sub-surface wireless charger, such as sub-surface wireless charger 102 is configured to operate at low coupling coefficients between, such as 0.1, e.g., given the distance between sub-surface wireless charger and receiver 102, e.g., based on the thickness of surface 104. Increasing the coupling coefficient may be desirable, which may advantageously increase the amount of power that can be wirelessly transfer from sub-surface wireless charger 102 to receiver 106.

In an embodiment of the present invention, a top-side ferrite sticker disposed between receiver 106 and top surface 104a advantageously increases the coupling coefficient between sub-surface wireless charger 102 and receiver 106. For example, FIG. 35 shows a schematic diagram of sub-surface wireless charging system 3500 including top-side ferrite sticker 3502, according to an embodiment of the present invention.

Figure 35:
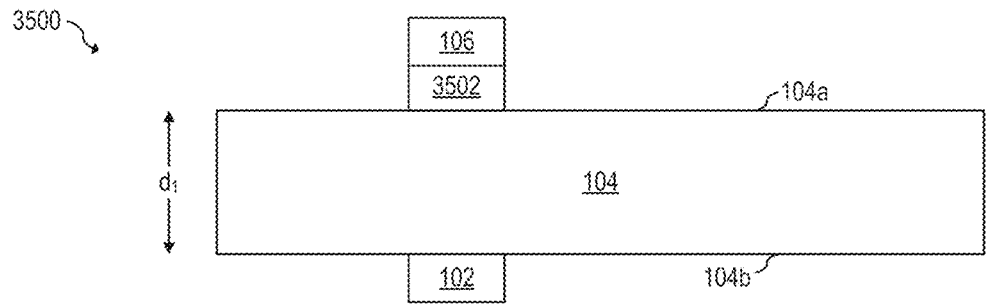
FIG. 35 shows a schematic diagram of a sub-surface wireless charging system including a top-side ferrite sticker, according to an embodiment of the present invention.

As shown in FIG. 35, top-side ferrite sticker 3502 is disposed between top surface 104a and receiver 106. During normal operation, the ferrite material in top-side ferrite sticker 3502 increases the coupling coefficient between sub-surface wireless charger 102 and receiver 106. In some embodiments, top-side ferrite sticker 3502 may double the coupling coefficient (e.g., from 0.1 to 0.2) between sub-surface wireless charger 102 and receiver 106. In some embodiments, top-side ferrite sticker 3502 may include a mark or may otherwise be indicative of a location of maximum coupling coefficient between sub-surface wireless charger 102 and receiver 106.

Figures 36, 37:
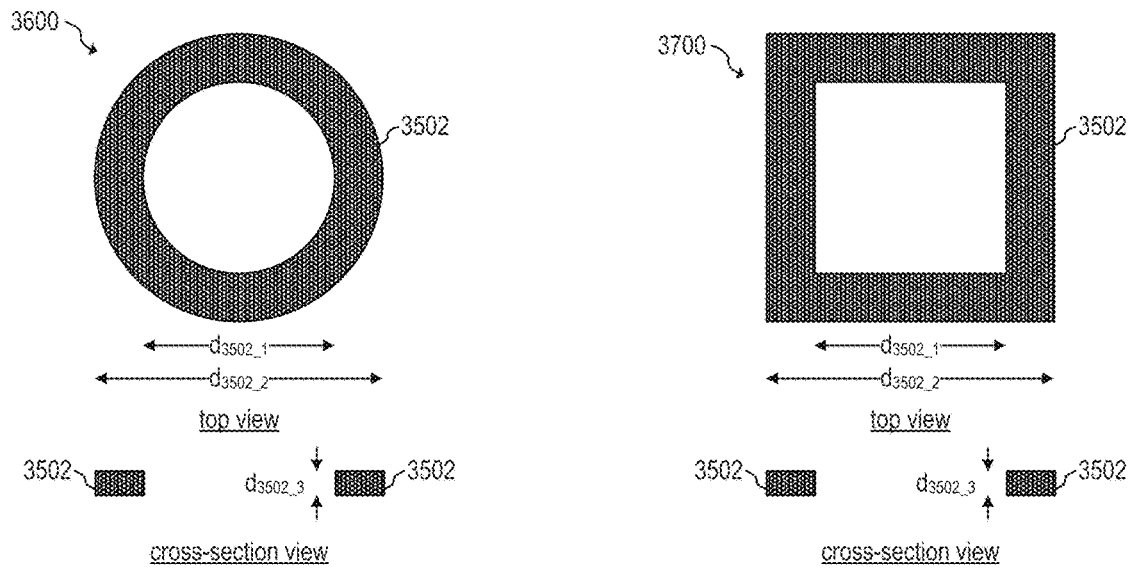
FIGS. 36 to 38 show schematic diagrams of possible implementations of a top-side ferrite sticker, according to embodiments of the present invention.
Figure 38:
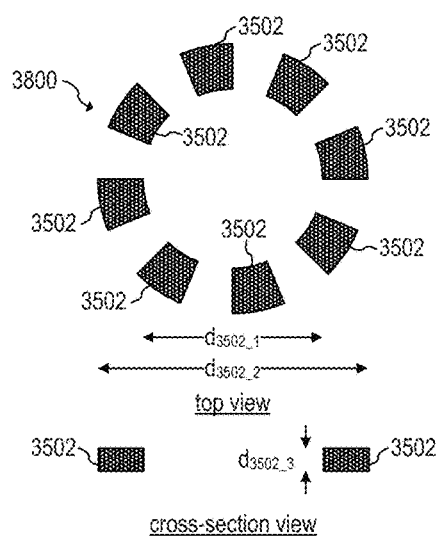

FIGS. 36 to 38 show schematic diagrams of possible implementations of top-side ferrite sticker 3502, according to embodiments of the present invention. Other shapes may also be used.

In some embodiments, distance $d_{3502\_2}$ is between 80 mm and 100 mm, distance $d_{3502\_1}$ is between 40 mm and 50 mm, and distance $d_{3502\_3}$ is between 0.1 mm and 0.2 mm. Other dimensions are also possible.

Figure 39:
FIG. 39 shows a way of cutting a strip of ferrite sticker to implement the top-side ferrite sticker of FIG. 38 with minimum waste, according to an embodiment of the present invention.

Advantages of embodiments such as shown in FIG. 38 includes that less material may be used while still substantially increasing the coupling coefficient between sub-surface wireless charger 102 and receiver 106. For example, FIG. 39 shows a way of cutting a strip of ferrite sticker 3902 to implement the top-side ferrite sticker of FIG. 38 with minimum waste, according to an embodiment of the present invention.

In some embodiments, wireless power transmission efficiency is increased by substantially reducing or eliminating the generation of Eddie currents in the enclosure of a sub-surface-wireless charger. In some embodiments, a metallic enclosure of a sub-surface wireless charger has an outer surface that is parallel to (i.e., tracks) the magnetic lines of the magnetic field generated by the transmitter coil during wireless charging. In some embodiments, at least a portion of an outer surface of the enclosure of the sub-surface wireless charger has a toroidal shape.

Figure 40:
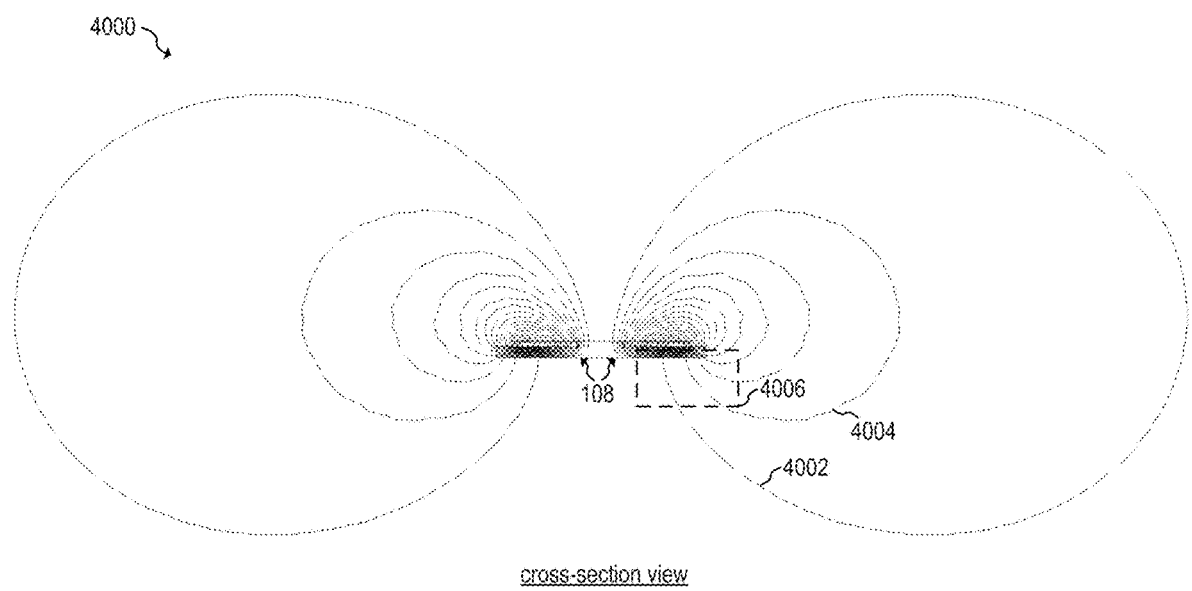
FIG. 40 shows a graph illustrating the magnetic field lines of a sub-surface wireless charger during wireless charging, according to an embodiment of the present invention.

FIG. 40 shows graph 4000 illustrating the magnetic field lines of sub-surface wireless charger 102 during wireless charging, according to an embodiment of the present invention. As shown by curves 4002 and 4004, for example, the magnetic field lines of sub-surface wireless charger 102 during wireless charging has a toroidal shape at location 4006.

Figure 41:
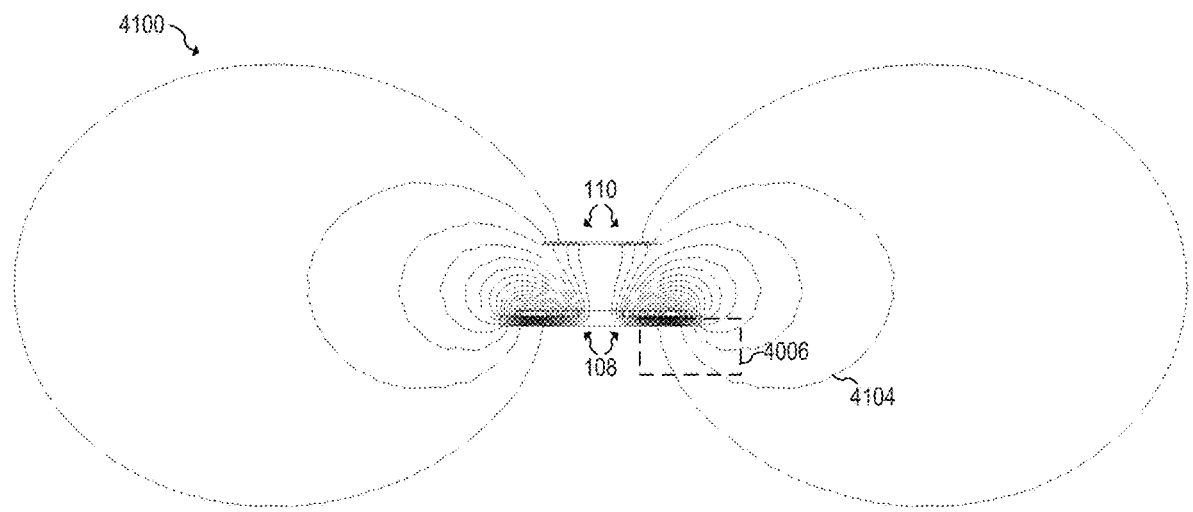
FIG. 41 shows a graph illustrating the magnetic field lines of a sub-surface wireless charger during wireless charging in the presence of a receiver, according to an embodiment of the present invention.

Since sub-surface wireless charger 102 is configured to operate at a distance from receiver 106 that is relatively long (e.g., greater than 10 mm, such as 20 mm), the presence of receiver 102 does not substantially perturb the shape of the magnetic field lines of sub-surface wireless charger 102 during wireless charging. For example, FIG. 41 shows graph 4100 illustrating the magnetic field lines of sub-surface wireless charger 102 during wireless charging in the presence of receiver 106, according to an embodiment of the present invention. As shown by curves 4102 and 4104, for example, the magnetic field lines of sub-surface wireless charger 102 during wireless charging has a toroidal shape at location 4006 and are substantially similar to curves 4002 and 4004 at location 4006.

Figure 42:
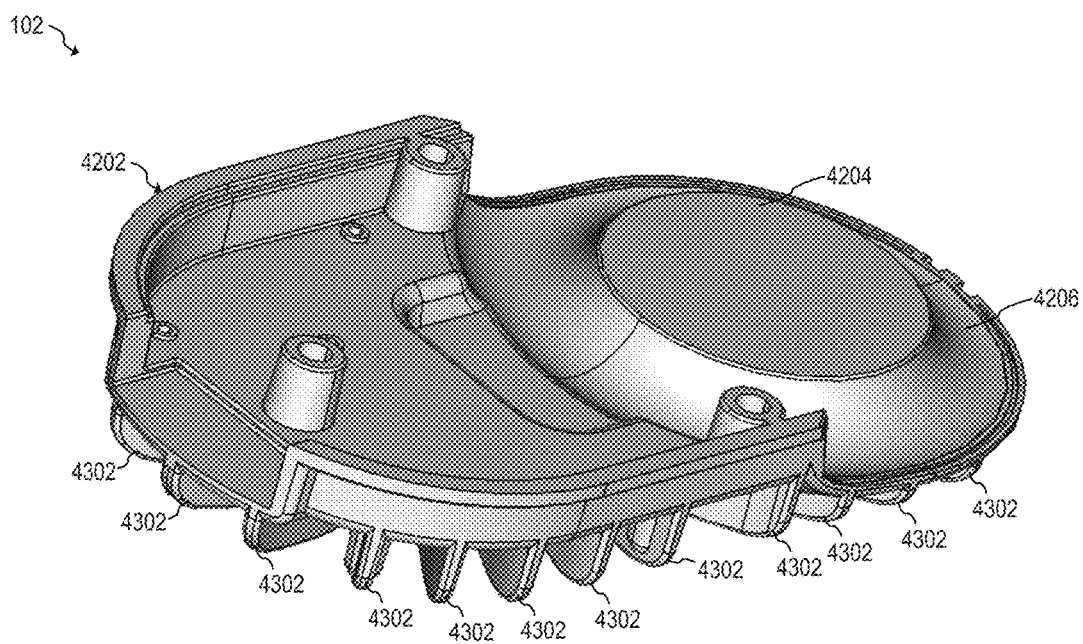
FIG. 42 shows a perspective view of a sub-surface wireless charger, according to an embodiment of the present invention.

FIG. 42 shows a perspective view of sub-surface wireless charger 102, according to an embodiment of the present invention. As shown in FIG. 42, sub-surface wireless charger 102 includes metallic heatsink 4202. Transmitter coil 108 (not shown in FIG. 42) is disposed on top of portion 4204 of metallic heatsink 4202.

As shown in FIG. 42, outer portion 4206 of metallic heatsink 4202 has a toroidal shape that is substantially similar to the shape of the magnetic field lines generated by sub-surface wireless charger 102 during wireless charging (illustrated, for example, in FIGS. 40 and 41). The toroidal shape of metallic heatsink 4202 advantageously substantially reduces or eliminates Eddie currents generated in the metallic heatsink.

Metallic heatsink 4202 may be implemented using metals such as Nickle or Zinc. Other metals may also be used.

Figure 43:
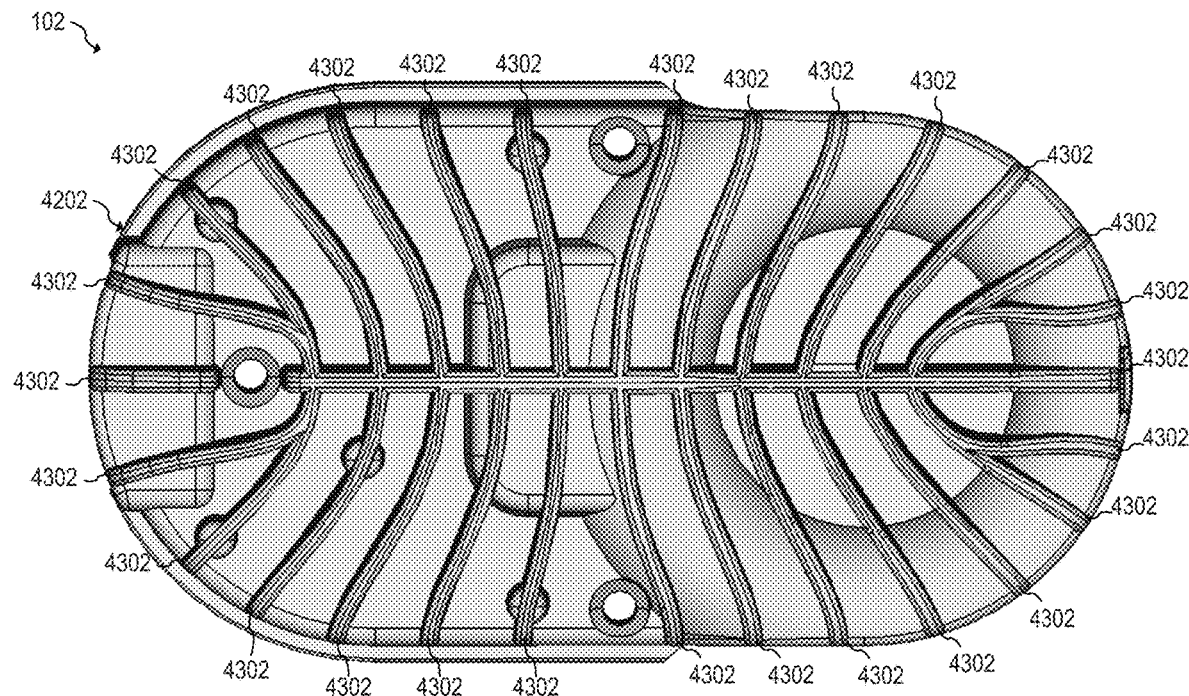
FIG. 43 shows a bottom view of a sub-surface wireless charger, according to an embodiment of the present invention.

FIG. 43 shows a bottom view of sub-surface wireless charger 102, according to an embodiment of the present invention. As shown in FIG. 43, metallic heatsink 4202 includes a plurality of fins 4302 that advantageously aid in dissipating heat, e.g., generated during wireless charging.

Figure 44:
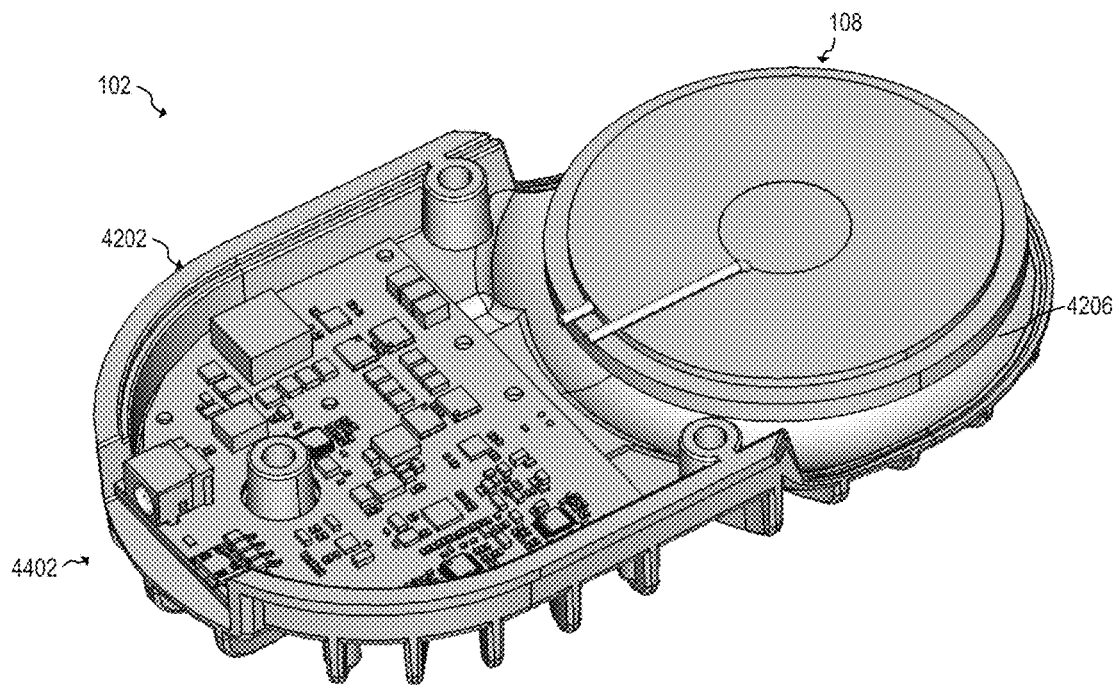
FIG. 44 shows a perspective view of a sub-surface wireless charger, according to an embodiment of the present invention.

FIG. 44 shows a perspective view of sub-surface wireless charger 102, according to an embodiment of the present invention. As shown in FIG. 44, transmitter coil 108 is disposed on top of heatsink 4202 and has a ring shape. PCB 4402 is also disposed on top of heatsink 4202 and includes sub-surface wireless charger 102 circuitry.

Example embodiments of the present invention are summarized here. Other embodiments can also be understood from the entirety of the specification and the claims filed herein

EXAMPLE 1

A device including: a plurality of sensing coils configured to receive wireless power from a sub-surface wireless charger; a measuring circuit coupled to the plurality of sensing coils and configured to sense a voltage across each of the plurality of sensing coils; a visual indicator; and a controller coupled to the measuring circuit and configured to: determine a direction of a location of maximum coupling coefficient between the sub-surface wireless charger and the device based on an output of the measuring circuit, and indicate the direction of the location of maximum coupling coefficient via the visual indicator.

EXAMPLE 2

The device of example 1, where the visual indicator includes a plurality of light emitting diodes (LEDs).

EXAMPLE 3

The device of one of examples 1 or 2, where the controller turns on all of the plurality of LEDs when the device is located at the location of maximum coupling coefficient between the sub-surface wireless charger and the device.

EXAMPLE 4

The device of one of examples 1 to 3, where the plurality of LEDs include N LEDs and the plurality of sensing coils include N sensing coils, where N is an integer number greater than 3.

EXAMPLE 5

The device of one of examples 1 to 4, where the measuring circuit includes an amplifier coupled to a sensing coil of the plurality of sensing coils, and an analog-to-digital converter (ADC) coupled to an output of the amplifier.

EXAMPLE 6

The device of one of examples 1 to 5, further including a mark that is symmetrically disposed with respect to the plurality of sensing coils.

EXAMPLE 7

The device of one of examples 1 to 6, further including a receiver coil, where the device is configured to be powered by the sub-surface wireless charger via the receiver coil.

EXAMPLE 8

The device of one of examples 1 to 7, further including a variable load, where the controller is further configured to: adjust the variable load to consume a predetermined amount of power; determine an amount of power received based on a voltage across the receiver coil and a current flowing through the receiver coil; and determine whether an actual amount of power received is at least equal to the predetermined amount of power.

EXAMPLE 9

The device of one of examples 1 to 8, where the receiver coil is a high inductance receiver coil, and where the controller is further configured to: receive a first pulse having a first energy from the sub-surface wireless charger; measure a voltage across the high inductance receiver coil; determine a calibration code based on the measured voltage;

and transmit the calibration code to the sub-surface wireless charger via the high inductance receiver coil by load modulation.

EXAMPLE 10

A sub-surface wireless charger including: a non-volatile memory; a transmitter coil; and a controller configured to: before calibration, transmit a first pulse having a first energy via the transmitter coil during a ping process, during calibration, transmit the first pulse having the first energy via the transmitter coil, receive a calibration code via the transmitter coil, store data corresponding to a second energy in the non-volatile memory based on the received calibration code, where the second energy is higher than the first energy, and after calibration, transmit a second pulse having the second energy via the transmitter coil, during the ping process.

EXAMPLE 11

The sub-surface wireless charger of example 10, where the controller is configured to not begin wireless charging before calibration.

EXAMPLE 12

The sub-surface wireless charger of one of examples 10 or 11, where the controller is configured to transmit the first pulse after detecting a receiver is proximate the sub-surface wireless charger based on a characteristic of the transmitter coil.

EXAMPLE 13

A sub-surface wireless charger includes: a transmitter coil; and a controller configured to: generate a protective pulse having a first energy, determine a characteristic of the transmitter coil based on the generated protective pulse, determine whether it is safe to begin wireless charging based on the determined characteristic, when the controller determines that it is safe to begin wireless charging, generate an operating pulse having a second energy, where the second energy is higher than the first energy.

EXAMPLE 14

The sub-surface wireless charger of example 13, where the protective pulse is configured to avoid causing a receiver to transmit data to the sub-surface wireless charger via the transmitter coil.

EXAMPLE 15

The sub-surface wireless charger of one of examples 13 or 14, further including: a capacitor coupled to the transmitter coil; and a switch coupled to the transmitter coil, where the controller is configured to generate the protective pulse by: opening the switch, causing the capacitor to charge to a first voltage, and closing the switch to cause the capacitor and the transmitter coil to operate as a resonant tank.

EXAMPLE 16

The sub-surface wireless charger of one of examples 13 to 15, where the characteristic of the transmitter coil includes an inductance of the transmitter coil, a series resistance of the transmitter coil, or a damping factor of a resonant tank that includes the transmitter coil.

EXAMPLE 17

The sub-surface wireless charger of one of examples 13 to 16, further including: an amplifier coupled to the transmitter coil; and an analog-to-digital converter (ADC) coupled to an output of the amplifier, where the controller is configured to determine the characteristic of the transmitter coil based on an output of the ADC.

EXAMPLE 18

The sub-surface wireless charger of one of examples 13 to 17, where the controller is configured to determine that it is not safe to begin wireless charging when an inductance of the transmitter coil is higher than a first threshold or lower than a second threshold, and where the first threshold is higher than the second threshold.

EXAMPLE 19

A sub-surface wireless charger includes: a transmitter coil; and a controller configured to: generate a first pulse having a first energy, receive a first response from a receiver via the transmitter coil during the first pulse, generate a second pulse having a second energy, the second energy being higher than the first energy, and prevent the sub-surface wireless charger from beginning wireless charging the receiver if a second response is not received from the receiver via the transmitter coil during the second pulse.

EXAMPLE 20

A sub-surface wireless charger includes: a transmitter coil; and a controller configured to: generate a first pulse having a first energy, receive a first response from a receiver via the transmitter coil during the first pulse, cause the transmitter coil to be energized after the first pulse, while the transmitter coil is energized, determine whether the receiver is performing detuning, and stop energizing the transmitter coil or reduce an energy level flowing through the transmitter coil when the controller determines that the receiver is performing detuning.

EXAMPLE 21

The sub-surface wireless charger of example 20, where the controller determines whether the receiver is performing detuning by: monitoring a voltage across the transmitter coil; and determining whether a signal with a frequency lower than 1 kHz has a second energy higher than a threshold.

EXAMPLE 22

The sub-surface wireless charger of one of examples 20 or 21, where the controller is configured to cause the transmitter coil to be energized during a second pulse.

EXAMPLE 23

The sub-surface wireless charger of one of examples 20 to 22, where the controller is configured to cause the transmitter coil to be energized during wireless charging of the receiver.

EXAMPLE 24

A wireless charger including: a sub-surface wireless charger having a first transmitter coil; and a repeater charger having a receiver coil and a second transmitter coil, where the sub-surface wireless charger is configured to generate wireless power using the first transmitter coil at a first frequency, and where the repeater charger is configured to: receive wireless power from the sub-surface wireless charger using the receiver coil, power a first circuit using the received wireless power, and generate wireless power using the second transmitter coil at a second frequency that is different from the first frequency.

EXAMPLE 25

The wireless charger of example24, where the first frequency is higher than the second frequency.

EXAMPLE 26

The wireless charger of one of examples 24 or 25, where the first frequency is 6.78 MHz and the second frequency is between 80 kHz and 300 kHz.

EXAMPLE 27

The wireless charger of one of examples 24 to 26, where the second transmitter coil surrounds the receiver coil.

EXAMPLE 28

The wireless charger of one of examples 24 to 27, where the repeater charger includes a first ferrite layer disposed above the second transmitter coil and a second ferrite layer disposed below the receiver coil.

EXAMPLE 29

The wireless charger of one of examples 24 to 28, where the first circuit includes a rectifier coupled to the receiver coil, and a driver coupled between the rectifier and the second transmitter coil.

EXAMPLE 30

The wireless charger of one of examples 24 to 29, where the sub-surface wireless charger includes a ferrite layer disposed below the first transmitter coil, the ferrite layer having a thickness of about 0.1 mm or less.

EXAMPLE 31

The wireless charger of one of examples 24 to 30, where the first transmitter coil is formed as traces in a printed circuit board (PCB).

EXAMPLE 32

The wireless charger of one of examples 24 to 31, where an outer perimeter of the first transmitter coil is substantially equal to an outer perimeter of the receiver coil.

EXAMPLE 33

The wireless charger of one of examples 24 to 32, where the repeater charger further includes a driver configured to drive the second transmitter coil, and a controller configured to: receive data from the second transmitter coil; demodulate the data received from the second transmitter coil; and control the driver based on the demodulated data.

EXAMPLE 34

The wireless charger of one of examples 24 to 33, where the repeater charger further includes a controller configured to: receive data from the second transmitter coil, the received data including an indication of a first average power received by a receiver; determine a second average power transmitted by the second transmitter coil; and determine whether a foreign metallic object is present in a charging space of the repeater charger by comparing the first average power with the second average power.

EXAMPLE 35

The wireless charger of one of examples 24 to 34, where the repeater charger further includes a communication interface coupled to the receiver coil, and a controller configured to: receive data from the second transmitter coil; and cause the communication interface to transmit, via the receiver coil, data based on the received data from the second transmitter coil via load modulation.

EXAMPLE 36

The wireless charger of one of examples 24 to 35, where the sub-surface wireless charger further includes a driver coupled to the first transmitter coil and a second controller configured to: receive data from the repeater charger via the first transmitter coil; demodulate the received data; and control the driver based on the demodulated data.

EXAMPLE 37

The wireless charger of one of examples 24 to 36, where the second controller is configured to: determine a first average power received by a receiver based on the received data from the repeater charger; determine a second average power transmitted by the second transmitter coil; and determine whether a foreign metallic object is present in a charging space of the repeater charger by comparing the first average power with the second average power.

EXAMPLE 38

The wireless charger of one of examples 24 to 37, where the second controller is configured to determine the second average power transmitted by the second transmitter coil based on the received data from the repeater charger.

EXAMPLE 39

The wireless charger of one of examples 24 to 38, where the sub-surface wireless charger further includes a driver coupled to the first transmitter coil and a second controller, where the repeater charger is configured to cause voltage variations across the second transmitter coil that are between a third frequency and a fourth frequency to propagate to the receiver coil, and where the second controller is configured to: receive data from the repeater charger via the first transmitter coil, where the received data is based on the voltage variations across the second transmitter coil between the third frequency and the fourth frequency;

demodulate the received data; and control the driver based on the demodulated data.

EXAMPLE 40

The wireless charger of one of examples 24 to 39, where the repeater charger further includes a second driver coupled to the second transmitter coil and an oscillator circuit coupled to the second driver, the second driver configured to drive the second transmitter coil based on an output of the oscillator circuit.

EXAMPLE 41

The wireless charger of one of examples 24 to 40, where the third frequency is 1 kHz and the fourth frequency is 2 kHz.

EXAMPLE 42

A wireless charger including: a sub-surface wireless charger including a transmitter coil and a first controller; and a foreign object detector including a sensing coil, a second controller and a communication interface coupled to the sensing coil, where the second controller is configured to: determine a first average power at a location of the sensing coil based on a voltage across the sensing coil, and transmit data based on the first average power via the sensing coil using the communication interface, and where the first controller is configured to: receive data from the transmitter coil, determine the first average power based on the received data, determine a second average power received by a receiver, and determine whether a foreign metallic object is present in a charging space of the sub-surface wireless charger by comparing the first average power with the second average power.

EXAMPLE 43

The wireless charger of example 42, where the sensing coil has a hollow shape and surrounds the second controller.

EXAMPLE 44

The wireless charger of one of examples 42 or 43, where the second controller is configured to: determine whether the receiver is sending data via the transmitter coil based on a voltage across the sensing coil; and transmit data to the sub-surface wireless charger when the receiver is not sending data via the transmitter coil.

EXAMPLE 45

The wireless charger of one of examples42 to 44, where the second controller is configured to determine whether the receiver is sending data via the transmitter coil by determining whether the voltage across the sensing coil includes a signal with a frequency between 1 kHz and 2 kHz and that has an energy higher than a threshold.

EXAMPLE 46

A wireless charger including: a sub-surface wireless charger; and a ferrite sticker having a hollow shape and disposed in a charging space of the sub-surface wireless charger and configured to be disposed between the sub-surface wireless charger and a receiver.

EXAMPLE 47

A wireless charger including: a transmitter coil; and a metallic heatsink having a first surface attached to the transmitter coil, where the transmitter coil is configured to produce a magnetic field when the transmitter coil is energized, and where the metallic heatsink has a second surface that has a shape that tracks magnetic lines of the magnetic field.

EXAMPLE 48

The wireless charger of example 47, where the second surface has a toroidal shape.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A sub-surface wireless charger comprising:
   a transmitter coil; and
   a controller configured to:
     generate a first digital pulse having a first energy;
     receive a first response from a receiver via the transmitter coil during the first digital pulse;
     generate a second digital pulse having a second energy, the second energy being higher than the first energy;
     prevent the sub-surface wireless charger from beginning wirelessly charging the receiver when a second response is not received from the receiver via the transmitter coil during the second digital pulse; and
     begin wirelessly charging the receiver when the second response is received from the receiver via the transmitter coil during the second digital pulse.

2. The sub-surface wireless charger of claim 1, wherein the controller is configured to cause the transmitter coil to be energized during wireless charging of the receiver.

3. The sub-surface wireless charger of claim 1, wherein the first digital pulse is repeatedly generated until the first response from the receiver is received, and wherein the first energy of the first digital pulse is respectively increased.

4. A sub-surface wireless charger comprising:
   a transmitter coil; and
   a controller configured to:
     generate a first digital pulse having a first energy;
     receive a first response from a receiver via the transmitter coil during the first digital pulse;
     generate a second digital pulse having a second energy, the second energy being higher than the first energy;
     while the transmitter coil is energized during the second digital pulse, determine whether the receiver performs detuning;
     prevent the sub-surface wireless charger from beginning wirelessly charging the receiver when the controller determines that the receiver performs detuning in response to the second digital pulse; and
     begin wirelessly charging the receiver when the controller determines that the receiver does not perform detuning in response to the second digital pulse.

5. The sub-surface wireless charger of claim 4, wherein the controller is configured to determine whether the receiver performs detuning by monitoring a voltage across the transmitter coil.

6. The sub-surface wireless charger of claim 5, wherein the controller is configured to determine whether the receiver performs detuning by determining whether a signal with a frequency lower than 1 kHz has an energy higher than a threshold.

7. The sub-surface wireless charger of claim 6, wherein the frequency is between 15 Hz and 1 kHz.

8. The sub-surface wireless charger of claim 6, wherein the frequency is determined by sampling the voltage with an analog-digital-converter and performing digital computations.

9. The sub-surface wireless charger of claim 6, wherein the frequency is determined by performing FFT.

10. The sub-surface wireless charger of claim 6, wherein the frequency is determined by measuring a time between peaks of the voltage across the transmitter coil.

11. The sub-surface wireless charger of claim 6, wherein the frequency is determined by detecting zero crossing of the voltage across the transmitter coil.

12. The sub-surface wireless charger of claim 4, wherein the controller is configured to determine during a time when a data transmission portion is expected whether the receiver performs detuning.

13. The sub-surface wireless charger of claim 4, wherein the controller is configured to determine during a time when a data transmission portion is not expected whether the receiver performs detuning.

14. A sub-surface wireless charger comprising:
a transmitter coil; and
a controller configured to:
   generate a first digital pulse having a first energy;
   receive a first response from a receiver via the transmitter coil during the first digital pulse;
   generate a second digital pulse having a second energy, the second energy being higher than the first energy;
   while the transmitter coil is energized during the second digital pulse, determine whether the receiver performs detuning;
   stop energizing the transmitter coil or reduce an energy level flowing through the transmitter coil when the controller determines that the receiver performs detuning; and
   begin wirelessly charging the receiver when the controller determines that the receiver does not perform detuning,
wherein the controller is further configured to determine whether the receiver performs detuning by determining whether a signal with a frequency has an energy higher than a threshold, and
wherein the frequency is determined by sampling a voltage across the transmitter coil with an analog-digital-converter and performing digital computations, or
wherein the frequency is determined by performing FFT, or
wherein the frequency is determined by measuring a time between peaks of the voltage across the transmitter coil, or
wherein the frequency is determined by detecting zero crossing of the voltage across the transmitter coil.

15. A sub-surface wireless charger comprising:
a transmitter coil; and
a controller configured to:
   generate a first digital pulse having a first energy;
   receive a first response from a receiver via the transmitter coil during the first digital pulse;
   generate a second digital pulse having a second energy, the second energy being higher than the first energy;
   while the transmitter coil is energized during the second digital pulse, determine whether the receiver performs detuning;
   stop energizing the transmitter coil or reduce an energy level flowing through the transmitter coil when the controller determines that the receiver performs detuning; and
   begin wirelessly charging the receiver when the controller determines that the receiver does not perform detuning
wherein the controller is configured to:
   determine during a time when a data transmission portion is expected whether the receiver performs detuning, or
   determine during a time when a data transmission portion is not expected whether the receiver performs detuning.

* * * * *